United States Patent
Sugiyama

[11] Patent Number: 5,933,625
[45] Date of Patent: Aug. 3, 1999

[54] UNIQUE TIME GENERATING DEVICE AND AUTHENTICATING DEVICE USING THE SAME

[75] Inventor: Akira Sugiyama, 27-102 Fujinokidai Danchi, 1, Sugesengoku 3-chome, Tama-ku, Kawasaki, Kanagawa, Japan

[73] Assignee: Akira Sugiyama, Kanagawa, Japan

[21] Appl. No.: 08/894,035

[22] PCT Filed: Aug. 30, 1996

[86] PCT No.: PCT/JP96/02433

§ 371 Date: Aug. 11, 1997

§ 102(e) Date: Aug. 11, 1997

[87] PCT Pub. No.: WO97/22047

PCT Pub. Date: Jun. 19, 1997

[30] Foreign Application Priority Data

| Dec. 11, 1995 | [JP] | Japan | 7/349415 |
| Apr. 12, 1996 | [JP] | Japan | 8/114319 |
| Apr. 16, 1996 | [JP] | Japan | 8/117152 |
| Jul. 12, 1996 | [JP] | Japan | 8/200962 |
| Aug. 20, 1996 | [JP] | Japan | 8/235822 |

[51] Int. Cl.$^6$ ........................ G06F 11/30
[52] U.S. Cl. ........................ 395/557
[58] Field of Search ............ 395/557, 559; 380/3, 4, 21, 28–30, 48–50

[56] References Cited

U.S. PATENT DOCUMENTS

| 5,444,780 | 8/1995 | Hartman, Jr. | 380/30 |
| 5,564,038 | 10/1996 | Grantz et al. | 380/4 X |
| 5,795,161 | 8/1998 | Vogel | 434/350 |

*Primary Examiner*—Thomas M. Heckler
*Attorney, Agent, or Firm*—Foley & Lardner

[57] ABSTRACT

A unique time generating device is incorporated in a computer which includes a CPU (1), a memory (2) and an I/O device (3). The CPU (1) includes a timer section (4) and an accumulating section (5), and the memory (2) includes a storage section (6) for storing a preset time-measuring period and a renewal section (7) for renewing the time-measuring period. The storage section (6) stores therein a total of time values Tt to be counted over the time-measuring period, which may, for example, be 3,155,692,500.97 seconds corresponding to a 100 year period. The timer section (4) constantly counts the total time value, and the accumulating section (5) calculates an accumulated time Tn progressively incrementing from the zeroth second toward the designated total time value Tt and a subtracted time (Tt−Tn) progressively decrementing from the total time value toward the zeroth second, so as to constantly measure an elapsed time within the preset period. Via the I/O device (3), such an elapsed time measured by the unique time generating device can be supplied to another computer, and an elapsed time measured by the other computer can be supplied to the unique time generating device.

7 Claims, 24 Drawing Sheets

FIG. 4

| IN CHIP PRODUCT NO. | TOTAL TIME VALUE TO BE COUNTED | STARTING POINT |
|---|---|---|
| PRODUCT 1 | 3,155,692,500.97 SEC. | 0:00'00".00 a.m., Jan. 1, 2000 |
| PRODUCT 2 | 3,155,692,500.97 SEC. | 0:00'01".00 a.m., Jan. 1, 2000 |
| PRODUCT 3 | 3,155,692,500.97 SEC. | 0:00'02".00 a.m., Jan. 1, 2000 |
| ↓ | | |
| PRODUCT n | 3,155,692,500.97 SEC. | n:n'n".n a.m., N.N, NNNN p.m. |

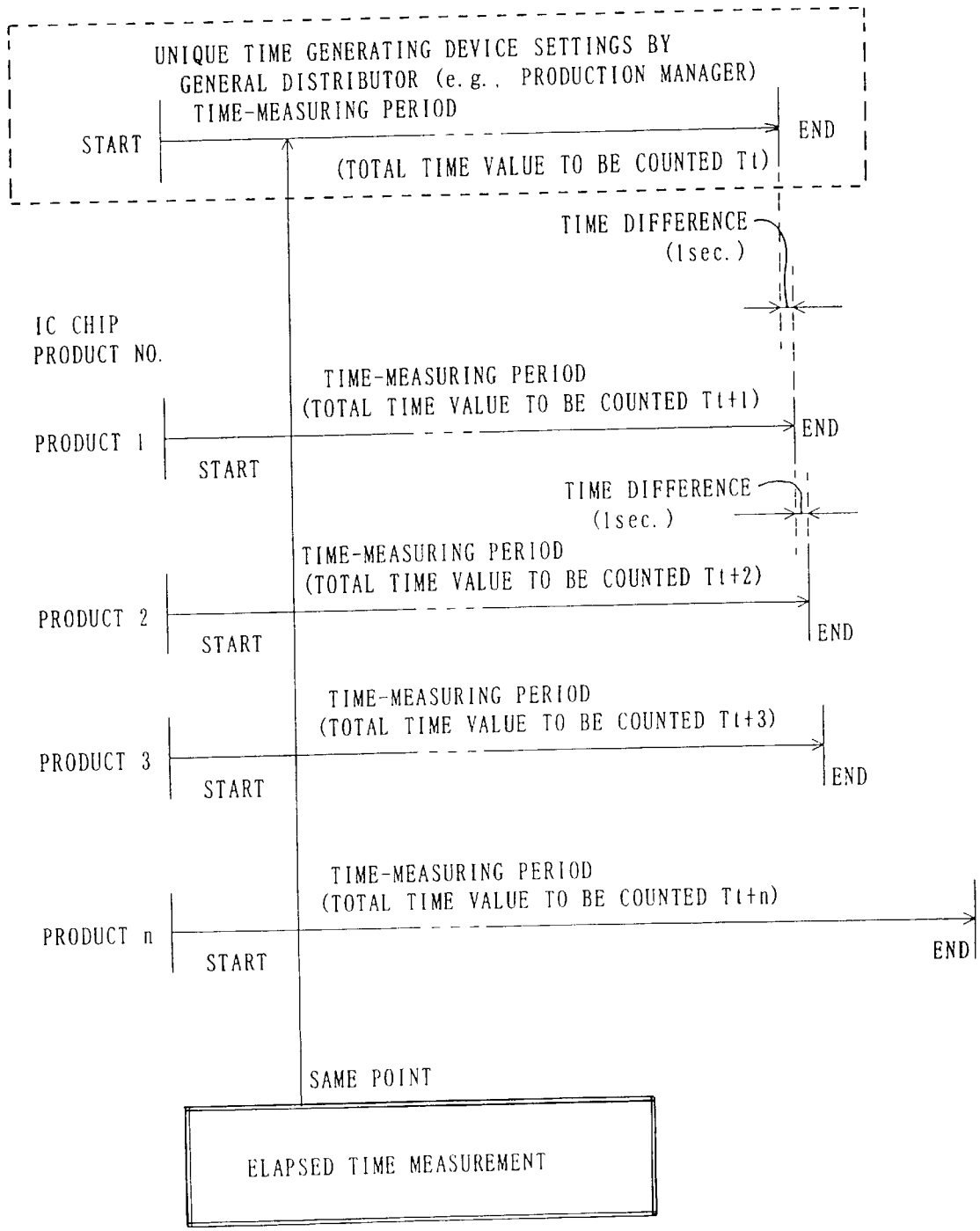

FIG. 6

```
MASTER DATA SET BY GENERAL DISRIBUTOR
(e.g., PRODUCTION MANAGER)

TOTAL TIME VALUE TO BE COUNTED         STARTING POINT
3,155,692,500.97 SEC.                  0:00'00".00 a.m., Jan. 1, 2000
         ‖
         Tt
```

IC CHIP
PRODUCT NO.

PRODUCT 1   TOTAL TIME VALUE TO BE COUNTED         STARTING POINT
            3,155,692,501.97 SEC.                  0:00'00".00 a.m., Jan. 1, 2000

PRODUCT 2   TOTAL TIME VALUE TO BE COUNTED         STARTING POINT
            3,155,692,502.97 SEC.                  0:00'00".00 a.m., Jan. 1, 2000

PRODUCT 3   TOTAL TIME VALUE TO BE COUNTED         STARTING POINT
            3,155,692,503.97 SEC.                  0:00'00".00 a.m., Jan. 1, 2000

PRODUCT n   TOTAL TIME VALUE TO BE COUNTED         STARTING POINT
            Tt+n                                   0:00'00".00 a.m., Jan. 1, 2000

FIG. 8

```
┌─────────────────────────────────────────────────────────────┐
│ MASTER DATA SET BY GENERAL DISRIBUTOR                       │
│    (e.g., PRODUCTION MANAGER)                               │
│                                                             │
│ TOTAL TIME VALUE TO BE COUNTED      STARTING POINT          │
│ 3,155,692,500.97 SEC.               0:00'00".00 a.m., Jan. 1, 2000 │
│                ‖                                            │
│                Tt                                           │
└─────────────────────────────────────────────────────────────┘
```

IN CHIP
PRODUCT NO.

| | TOTAL TIME VALUE TO BE COUNTED | STARTING POINT |
| --- | --- | --- |
| PRODUCT 1 | 3,155,692,500.97 SEC. | 0:00'00".00 a.m., Jan. 1, 2000 |
| PRODUCT 2 | 3,155,692,500.97 SEC. | 0:00'00".00 a.m., Jan. 1, 2000 |
| PRODUCT 3 | 3,155,692,500.97 SEC. | 0:00'00".00 a.m., Jan. 1, 2000 |

| PRODUCT n | 3,155,692,500.97 SEC. | 0:00'00".00 a.m., Jan. 1, 2000 |
| --- | --- | --- |

FIG. 12
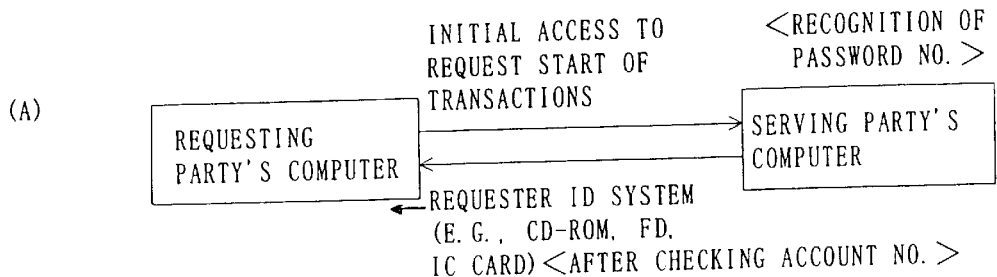
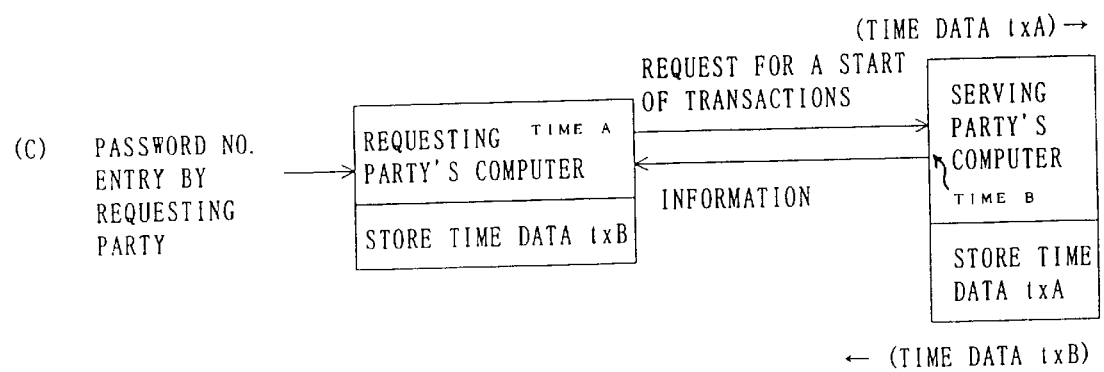
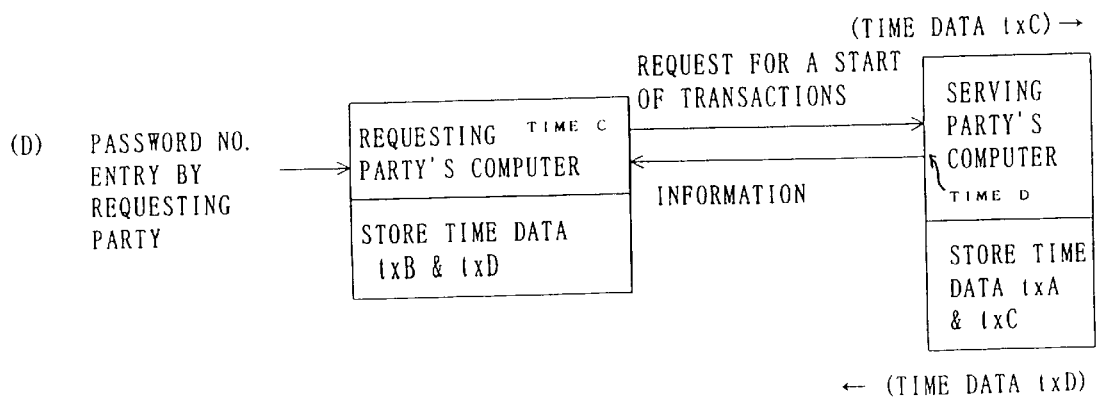

REQUESTER AUTHENTICATION SYSTEM

SERVER AUTHENTICATION SYSTEM

FIG. 20
(A)
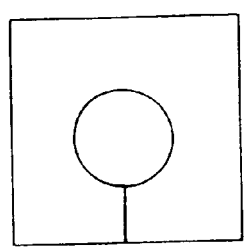
TO-BE-INSTALLED
PROGRAM
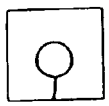
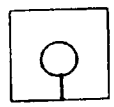
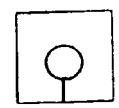
APPLICATION PROGRAMS
(B)
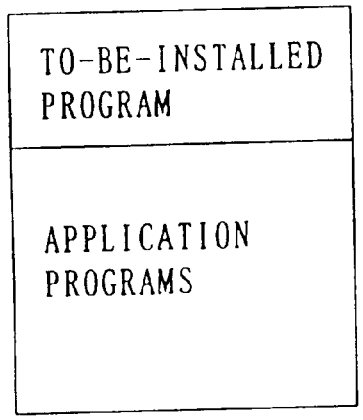
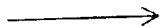
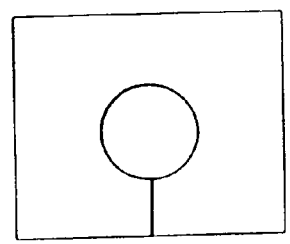
INTEGRATED
PROGRAM

FIG. 21

A FLOWCHART ILLUSTRATING EXEMPLARY OPERATION OF TIME DATA SETTING SECTION

READ OUT UNIQUE TIME MEASUREMENT YIELDED BY DEVICE A PREDETERMINED TIME AFTER TO-BE-INSTALLED PROGRAM IS SET IN DRIVE

STEP1

SEND READ-OUT UNIQUE TIME MEASUREMENT ENCRYPTING SECTION

STEP2

ENCRYPT THE UNIQUE TIME MEASUREMENT BY SCRAMBLING IN ACCORD. WITH A GIVEN RULE

STEP3

RECEIVE TIME DATA tx FROM ENCRYPTING SECTION

STEP4

SEND TIME DATA tx TO COMPUTER MEMORY & TO-BE-INSTALLED PROGRAM FOR STORAGE THEREIN

STEP5

CONSEQUENTLY, APPLICATION PROGRAM (COMPUTER SOFTWARE) CONCERNED & COMPUTER ARE RELATED TO EACH OTHER BY TIME DATA tx. & COMPUTER IS DETERMINED WHERE APPLICATION PROGRAM SHOULD BE INSTALLED

FIG. 22
(A)
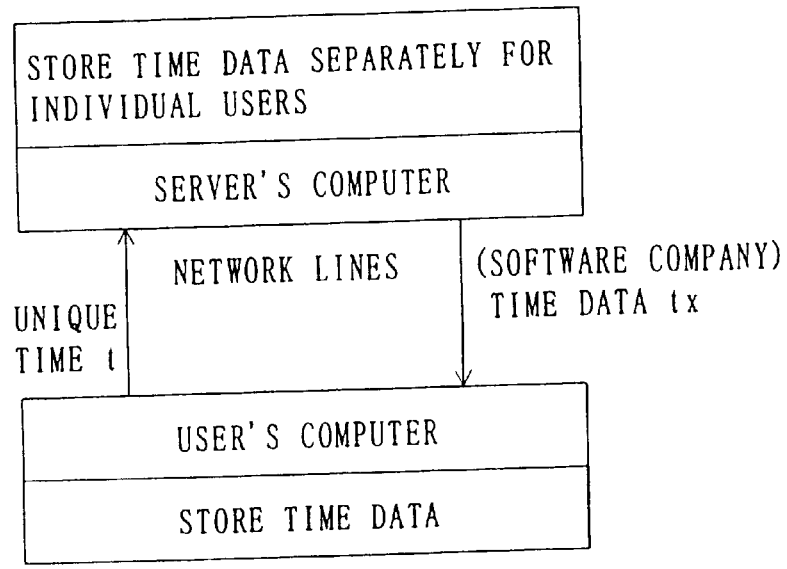
(B)
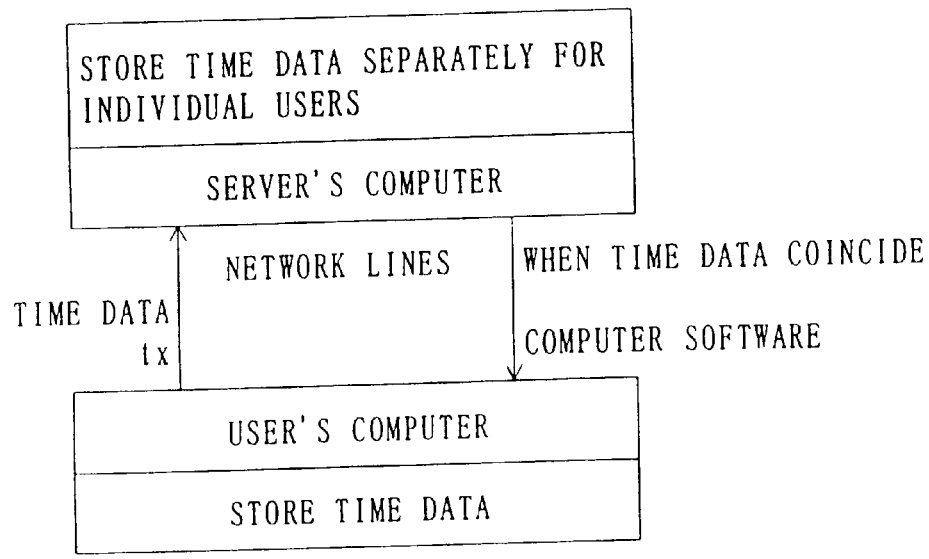

GREENWICH MEAN TIME

BEGINNING OF THE UNIVERSE ⎯⎯⎯⎯⎯⎯⎯⎯⎯→ FUTURE ∞

CURRENT TIME: 11:20′ 22″ a.m.,
July, 1996

FIG. 27

(A) ◎BUSINESS-RELATED DATA STORED IN FD MAY BE EASILY READ BY OTHER'S COMPUTER

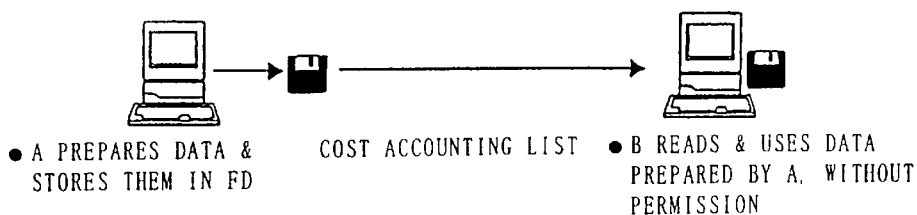

- A PREPARES DATA & STORES THEM IN FD
- COST ACCOUNTING LIST
- B READS & USES DATA PREPARED BY A, WITHOUT PERMISSION (B) ◎DATA RELATING TO BUSINESS SECRET MAY BE COPIED, SOLD & USED WHEN RETIRING FROM BUSINESS FIRM

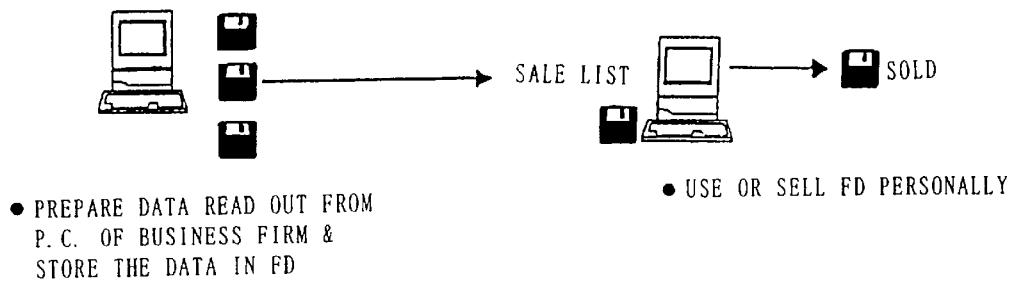

- PREPARE DATA READ OUT FROM P.C. OF BUSINESS FIRM & STORE THE DATA IN FD
- USE OR SELL FD PERSONALLY (C) ◎INFORMATION (CUSTOMER MANAGEMENT SYSTEM) PREPARED BY OTHER MAY BE COPIED & USED BY UNFAIRLY OBTAINING TRIGERING & ACCESSING PASSWORDS

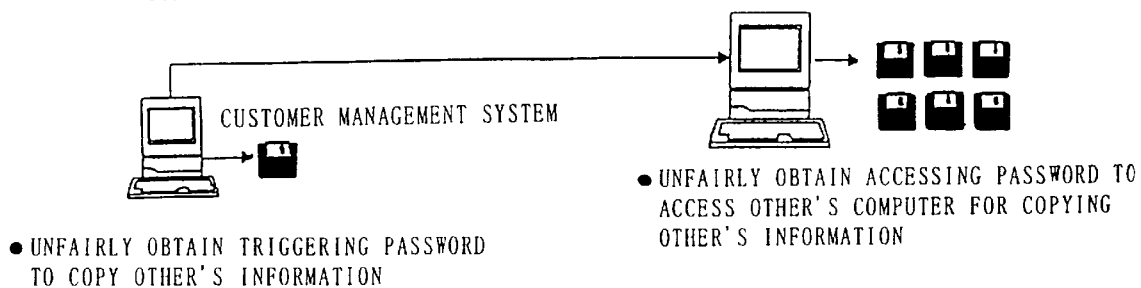

- UNFAIRLY OBTAIN TRIGGERING PASSWORD TO COPY OTHER'S INFORMATION
- UNFAIRLY OBTAIN ACCESSING PASSWORD TO ACCESS OTHER'S COMPUTER FOR COPYING OTHER'S INFORMATION

UNIQUE TIME GENERATING DEVICE AND AUTHENTICATING DEVICE USING THE SAME

BACKGROUND OF THE INVENTION

1. Field of the Invention

The present invention relates to a unique time generating device incorporated in a computer which permits communication between a plurality of computers based on a common time concept, and also to an authenticating device using the unique time generating device to allow the computers to authenticate each other without errors.

2. Description of the Related Art

An atomic clock (cesium clock) is known at present as the most accurate time measuring device, which is accurate to one part in $10^8$ sec. Specifically, such an atomic clock defines, as one second, the duration of the natural resonance frequency of the cesium atom (9,192,631,770), and International Atomic Time is determined by the Bureau International de l'Heure (on the premises of the Paris Astronomical Observatory) by averaging the measured values of atomic clocks located throughout the world. The value of the second is thus managed today in accordance with the internationally determined atomic time, whereas the length of the day is managed in accordance with Universal Time. According to Universal Time, the hours of the day are numbered from 0 to 24, using as 0:00 p.m. (noon) a time point when the sun crosses the Prime Meridian of longitude passing through the old Greenwich Observatory, England (southing time) and using as 0:00 a.m. (midnight) a time point 12 hours before and after the southing time. The local standard time in each individual country of the world is set on the basis of a predetermined longitude passing through the country, and it is determined how many hours the local standard time is ahead or behind Universal time (Greenwich Mean Time). Specifically, Japan standard time is set, using as 0:00 p.m. a time point or southing time when the sun crosses Akashi Observatory (the 135th degree of east longitude). Further, in a large majority of the countries of the world, the Gregorian calendar is still used, in accordance with which each common year is set to have 365 days while every fourth year is set as a leap year having a total of 366 days. The Gregorian calendar was introduced on the basis of the fact that one revolution period of the earth relative to the sun (one solar year) is 365.2422 days, and it defines one year using its approximate value of 365.2425 days as one solar year.

However, the setting of the year and day based on the astronomical periods (such as the periods of the earth's revolution around the sun and rotation on its own axis) is not satisfactory, because the length of the day is somewhat changing due to the fact that the speed of the earth's rotation on its axis is not always constant by being influenced by fluctuations of the earth's axis and seasonal variations. In addition, because the speed of the earth's rotation on its axis has a tendency to slow down little by little, a slight difference arises between International Atomic Time constantly measured by the atomic clocks and Universal Time measured on the basis of the movements of heavenly bodies. This difference between the two times is currently compensated for by adding or removing one second (leap second) to or from the last minute on June 30 or December 31 in the year when it has exceeded 0.9 second.

The time management on the earth today is conducted using the date and hour day and time concept based on such Universal time, International Atomic Time and Gregorian calendar, and various equipment existing on the earth, such as computer-containing control equipment involving accurate timing control, contains a timer circuit (such as a quartz oscillator circuit), to which the current time (Universal Time) is input so as to perform timewise drive control of the equipment on the basis of time indicated by the timer circuit. That is, in general commercially available computers and memory-contained timekeepers, calendar data for 100 years to come (corresponding to the life of the equipment) are prestored so that a current time is sequentially displayed through timer operation of a quartz oscillator circuit according to the prestored calendar data. Such time set on the basis of Greenwich Mean Time is, so to speak, "artificially set time" based on astronomical occurrences, such as the earth's revolution around the sun and rotation on its own axis, which lasts from the beginning of the universe to the future to constantly indicate a changing current time of, e.g., 11:20'22" a.m., Jan. 20, 1996 as shown in FIG. 26.

In recent years, however, it has become necessary to remotely operate various control equipment loaded in a spacecraft operating off the earth's time space (such as a weather satellite moving around the earth or an interplanetary probe satellite), and to connect, in a network, computers located in various countries of the world so as to allow the computers to access information at predetermined timing. If, in such applications, time to be used in common between the computers is to be set on the basis of Universal Time or the local standard time of a specific country, a leap second occurring once in some years must be considered and proper access may not be guaranteed because it is unclear whether there exists a same time standard with another party's computer (e.g., whether a specific party's computer indicates the same time as the other party's computer). In view of this inconvenience, a variety of approaches have been proposed (e.g., in Japanese Patent Laid-open publication No. HEI 4-337943) to smooth the necessary time management, but they could not provide a satisfactory solution to the problem. Further, in the case of a spacecraft flying away from the earth to a far remote planet (such as the "Voyager" rocket searching Saturn), variations in gravitational field would cause "slowing of clocks" as referred to in Einstein's general theory of relativity even though a high-accuracy atomic clock is loaded in the spacecraft's computer. Namely, in a gravitational field far from the earth, electrons move more slowly and hence the frequency of radiated light becomes lower, so that the atomic clock measuring the frequency of light radiated from an atom (cesium atom) is unable to measure time accurately.

SUMMARY OF THE INVENTION

It is therefore an object of the present invention to provide a technique which is capable of setting a common or different time concept between a plurality of computers so as to to achieve a smooth network communication between the computers and to also allow the computers to reliably authenticate each other.

In order to accomplish the above-mentioned object, the present invention provides a unique time generating device incorporated in a computer, which comprises: timer means; and accumulating means for sequentially accumulating unit time values outputted by the timer means within a preset time-measuring period that begins at a given starting point on a selected date and terminates at a given future ending point.

The present invention also provides a unique time generating device incorporated in computers sequentially manufactured and used, which comprises timer means; and accumulating means for sequentially accumulating unit time values outputted by the timer means within a preset time-measuring period that begins at a given starting point on a selected date and terminates at a given future ending point, wherein each of the computers accumulates unit time values within the time-measuring period having the starting point and ending point that are different from those of the time-measuring period assigned to the other unique time generating device.

In the unique time generating device, the respective starting points of the time-measuring periods allocated to the computers are different from each other by a predetermined interval.

The time-measuring periods allocated to the sequentially manufactured and used computers begin at a same starting point but have respective duration differing from each other by a predetermined length.

When network communication or communication-based transactions is to be conducted between the sequentially manufactured and used computers or with another computer, the authenticating device transmits to the other computer the unique time measurement outputted by the unique time generating device, as identification data of the associated computer.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, each of the computers of the transaction-requesting party and the transaction-serving party incorporating therein the unique time generating device, which, after the computer of the transaction-requesting party accesses the transaction-serving party to request a start of the transactions, allows the computer of the transaction-requesting party to set and store predetermined time data on the basis of a unique time measurement, outputted by the unique time generating device incorporated in the computer of the transaction-requesting party when the start of the transactions is identified, and to also transmit the time data to the computer of the transaction-serving party for storage therein, and which then allows the computer of the transaction-requesting party to use the time data as a password so that the transaction-serving party can subsequently identify the transaction-requesting party on the basis of the password.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, each of the computers of the transaction-requesting party and the transaction-serving party incorporating therein the unique time generating device, which, after the computer of the transaction-requesting party accesses the transaction-serving party to request a start of the transactions, allows the computer of the transaction-serving party to prepare and store predetermined time data on the basis of a unique time measurement, outputted by the unique time generating device incorporated in the computer of the transaction-serving party when the start of the transactions is identified, and to also transmit the time data to the computer of the transaction-requesting party for storage therein, and which then allows the computer of the transaction-requesting party to use the time data as a password so that the transaction-serving party can subsequently identify the transaction-requesting party on the basis of the password.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, each of the computers of the transaction-requesting party and the transaction-serving party incorporating therein the unique time generating device, which, in successive transactions after the start of the transactions between the computer of the transaction-requesting party and the computer of the transaction-serving party, allows the computer of the transaction-requesting party to prepare and store predetermined time data by selectively extracting two or more of a plurality of predetermined times recognized on the basis of unique time measurements, outputted for the individual transactions from the unique time generating device incorporated in the computer of the transaction-requesting party or by combining the predetermined times, and to also transmit the time data to the computer of the transaction-serving party for storage therein, and which then allows the computer of the transaction-requesting party to use the time data as a password so that the transaction-serving party can identify the transaction-requesting party on the basis of the password in each of subsequent transactions.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, each of the computers of the transaction-requesting party and the transaction-serving party incorporating therein the unique time generating device, which, in successive transactions after the start of the transactions between the computer of the transaction-requesting party and the computer of the transaction-serving party, allows the computer of the transaction-serving party to prepare and store predetermined time data by selectively extracting two or more of a plurality of predetermined times recognized on the basis of unique time measurements, outputted for the individual transactions from the unique time generating device incorporated in the computer of the transaction-serving party or by combining the predetermined times, and to also transmit the time data to the computer of the transaction-requesting party for storage therein, and which then allows the computer of the transaction-requesting party to use the time data as a password so that the transaction-serving party can identify the transaction-requesting party on the basis of the password in each of subsequent transactions.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, the computers of the transaction-requesting party and the transaction-serving party each incorporating therein the unique time generating device, which, after the computer of the transaction-requesting party accesses the transaction-serving party to request a start of the transactions, allows the computer of the transaction-requesting party to prepare and store predetermined time data on the basis of a unique time measurement, outputted by the unique time generating device incorporated in the computer of the transaction-requesting party when the start of the transactions is identified, and to also transmit the time data to the computer of the transaction-serving party for storage therein, which allows the computer of the transaction-requesting party or the computer of the transaction-serving party to use the time data as a password so that the transaction-serving party or the transaction-requesting party can identify the other party on the basis of the password, which also allows the computer of the transaction-serving party to prepare and store predetermined time data on the basis of a unique time measurement, outputted by the unique time generating device incorporated in the computer of the transaction-serving party when the start of the transactions is identified, and to also transmit the time data to the computer of the transaction-requesting party for storage therein, and which then allows the computer of the transaction-requesting party or the computer of the transaction-serving party to use the time data as a password so that the transaction-serving party or the transaction-requesting party can identify the other party on the basis of the password.

The present invention also provides an authenticating device using a unique time generating device, which is applied to communication-based transactions between a computer of a transaction-requesting party and a computer of a transaction-serving party interconnected via a communication line in such a manner the transaction-serving party receives a transaction request from the transaction-requesting party and then sends information relating to the transactions in response to the received transaction request, the computers of the transaction-requesting party and the transaction-serving party each incorporating therein the unique time generating device, which, in successive transactions after the start of the transactions between the computer of the transaction-requesting party and the computer of the transaction-serving party, allows each of the computer of the transaction-requesting party and the computer of the transaction-serving party to prepare and store predetermined time data by selectively extracting two or more of a plurality of predetermined times recognized on the basis of unique time measurements, outputted for the individual transactions from the unique time generating devices or by combining the predetermined times, and to also transmit the time data to the computer of the other party for storage therein, and which then allows each of the computer of the transaction-requesting party and the computer of the transaction-serving party to use the time data determined thereby as its own password or to transmit the time data determined thereby to the computer of the other party for use thereby as a password so that the transaction-serving party and the transaction-requesting party identify each other.

The present invention also provides an authenticating device using a unique time generating device, which permits communication to be continued for a subsequent transaction, only when the passwords transmitted from the transaction-requesting party and transaction-serving party coincide with each other.

In the authenticating device, the identification data is encrypted by the associated computer before being transmitted to the other computer.

The present invention also provides a unique time generating device incorporated in CPUs of computers sequentially manufactured and used, which comprises: timer means; and accumulating means for sequentially accumulating unit time values outputted by the timer means within a preset time-measuring period that begins at a given starting point on a selected date and terminates at a given future ending point, wherein the CPUs of the sequentially manufactured and used computers accumulate unit time values within the time-measuring periods having the same starting point and ending point.

The present invention also provides a unique time generating device, wherein the sequentially manufactured and used computers accumulate unit time values within the time-measuring periods having the same ending point for individual manufactures or users.

In the unique time generating device, communication between two or more of the sequentially manufactured and used computers is conducted on the basis of a same unique time measurement outputted by the accumulating means.

The unique time generating device of the present invention also provides allows equipment, connected with a single particular computer, to be remote-controlled in accordance with an instruction from another computer, by time control based on a same unique time measurement.

The present invention also provides an authenticating device using a unique time generating device, which identifies a particular computer when computer software is to be installed therein to thereby prevent the computer software from being installed in another computer than the particular computer, the authenticating device comprising: time data storage means for, when the computer software is to be installed, storing time data, determined on the basis of an optional unique time measurement outputted by the unique time generating device, as defined in claims 1 to 14 or 15 and 16, provided in the particular computer, into a memory of the particular computer and the computer software; and time data collating means for, when the computer software is to be installed, collating the time data stored in the memory of the particular computer and the time data stored in the computer software, and allowing the computer software to be installed in the particular computer only when the time data in the memory of the particular computer and the time data in the computer software coincide with each other.

The present invention also provides an authenticating device using a unique time generating device, wherein the computer software is supplied from a serving party to the particular computer via a communication line so that a user of the particular computer installs the computer software, supplied via the communication line, in the particular computer, wherein the time data is transmitted from the time data storage means to the memory of the particular computer and a computer of the serving party for storage therein, and wherein the time data collating means collates time data determined on the basis of an optional unique time measurement transmitted from the serving party and time data stored in the memory of the particular computer.

The present invention also provides an authenticating device using a unique time generating device, wherein the time data is set by selecting one of the unique time measurements outputted by the unique time generating device in correspondence with a series of operational steps for installing the computer software.

The present invention also provides an authenticating device using a unique time generating device, wherein the time data is determined by selectively extracting two or more of the unique time measurements outputted by the unique time generating device in correspondence with a series of operational steps for installing the computer software, or by combining the unique time measurements.

The present invention also provides an authenticating device using a unique time generating device, which comprises: time data storage means for, when information is to be prepared by a particular computer, storing time data, determined on the basis of an optional unique time measurement outputted by the unique time generating device, into a memory of the particular computer and an information storage medium for storing the prepared information; and time data collating means for, when the prepared information is to be used, collating the time data stored in the memory of the particular computer and the time data stored in the information storage medium, and allowing the information storage medium to be used in the particular computer only when the time data in the memory of the particular computer and the time data in the information storage medium coincide with each other.

BRIEF DESCRIPTION OF THE ACCOMPANYING DRAWINGS

The above and other objects and advantages of the present invention will become apparent from the following detailed description of the preferred embodiments when read in conjunction with the accompanying drawings, in which:

FIG. 4 is a chart showing corresponding relationships between total time values to be counted by the unique time generating devices and the respective starting points of the time-measuring periods;

FIG. 5 is a chart showing several time-measuring periods, assigned to the unique time generating devices, having different ending points;

FIG. 6 is a diagram showing total time values to be counted by the unique time generating devices of FIG. 5;

FIG. 8 is a diagram showing total time values to be counted by the unique time generating devices of FIG. 7;

FIG. 12 is a block diagram showing an initial access conducted between transaction-requesting and transaction-serving parties in an authenticating device using unique time generating devices according to the first embodiment of the present invention;

FIG. 20 is a diagram showing two forms of application programs incorporating therein the authenticating device;

FIG. 21 is a flowchart illustrating exemplary operation of the time data setting section;

FIG. 22 is a block diagram illustrating a manner in which computer software is supplied for installation via a network;

FIG. 27 is a diagram explanatory of unauthorized use of information encountered in the past.

DETAILED DESCRIPTION OF THE PREFERRED EMBODIMENTS

Before going into the details of a unique time generating device of the present invention, the concept of the "unique time" proposed by the inventor of the present invention will be explained below. As previously stated in relation to the prior art, the today's time management is effected using a time concept based on Greenwich Mean Time; in contrast, the "unique time" is a time concept to linearly count a previously-set finite time amount from the zeroth toward the last second thereof, i.e. to constantly measure changing current elapsed times toward the last second within a preset time-measuring period.

Figures 25, 26:
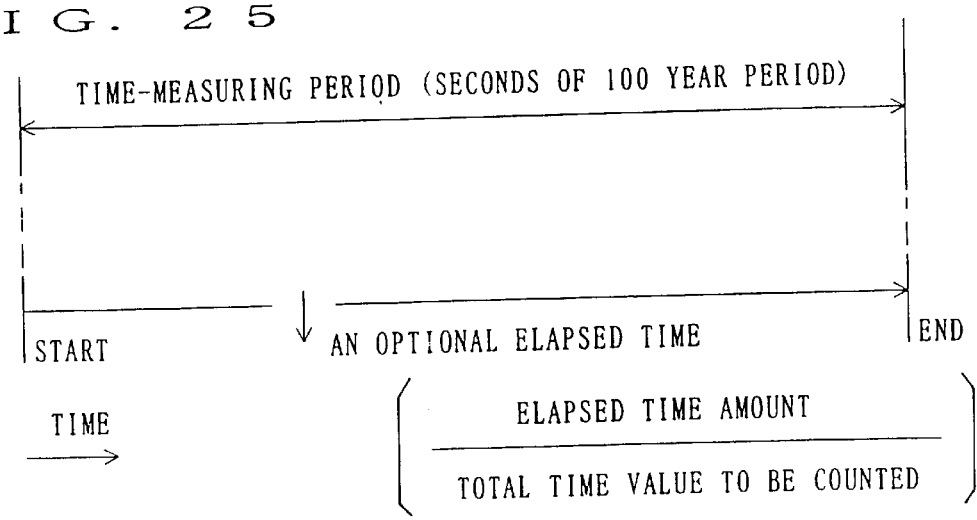
FIG. 25 is a diagram explaining the concept of a unique time measurement according to the present invention.
FIG. 26 is a diagram explanatory of Greenwich Mean Time commonly used in the world.

Describing the "unique time" in relation to FIG. 25, it is used to show changing elapsed time measurements within the preset time-measuring period at equal intervals (e.g., using a second as a unit time value).

A total time value to be counted over the preset time-measuring period may be optionally set, for example, to correspond to a total value of seconds over a period of ten or 100 years, and every elapsed time within the preset time-measuring period is measured by constantly counting the total time value. For example, the total time values for one, ten and 100 years will be as follows:

Total time value to be counted over a one year period= 31,556,925.9747 seconds (one year=365.2425 days);

Total time value to be counted over a ten year period= 315,569,250.9747 seconds; and Total time value to be counted over a 100 year period= 3,155,692,500.9747 seconds.

Figure 2:
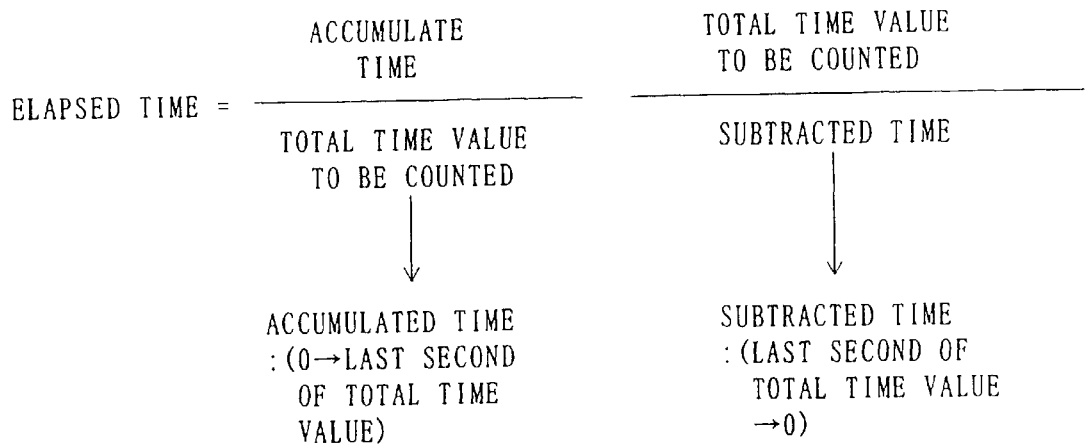
FIG. 2 is a diagram explanatory of a manner in which an elapsed time is calculated in accordance with the embodiment of the present invention.

Here, the "total time value" is expressed in time units of $\frac{1}{10,000}$ of a second measured by an atomic clock (cesium clock), and a "unique time" is obtained by constantly counting the total time value to identify a changing current elapsed time. Elapsed time (unique time measurement) is obtained from both an accumulated time and a subtracted time, as shown in FIG. 2. The accumulated time is a time value measured upwardly from the zeroth second toward the last second of the total time value to be counted, while the subtracted time is a time value measured downwardly from the last second value toward the zeroth second of the total time value. Alternatively, a unique time measurement may be obtained from either the accumulated time or the subtracted time or by adding some variables to the time.

Figure 1:
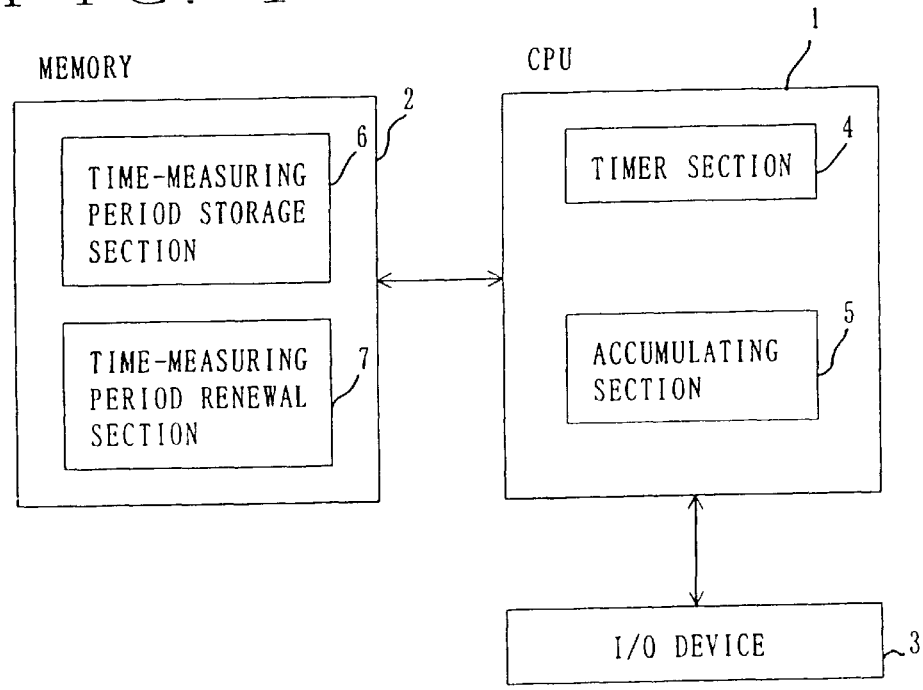
FIG. 1 is a block diagram illustrating a general configuration of a computer which implements a unique time generating device according to an embodiment of the present invention.

Next, a description will be made about a unique time generating device according to a preferred embodiment of the present invention. This unique time generating device is incorporated in a computer as shown in FIG. 1, which generally comprises a CPU 1, a memory 2 and an I/O (input/output) device 3. The CPU 1 includes a timer section 4 and an accumulating section 5, and the memory 2 includes a storage section 6 for storing therein a time-measuring period, and a time period renewal section 7. Specifically, in the storage section 6, there is stored a total time value Tt to be counted over the time-measuring period, such as the one for the 100 year period, 3,155,692,500.97 seconds (which in this case is expressed in time units of $\frac{1}{100}$ second).

The timer section 4 counts the total time value Tt constantly at a predetermined rate of 100 times per second. It suffices that the timer section 4 count clock ticks every $\frac{1}{100}$ second. The timer section 4 may effect the counting by, for example, quantitatively and constantly moving pixels corresponding to ticks in an imaginary space and measuring a time of movement of the pixels, or by employing a quartz oscillator circuit as in the conventionally known technique. Further, the use of a cesium oscillator will permit an even higher accuracy up to one part in $10^8$ sec.

The accumulating section 5 sequentially accumulates each unit time value or clock tick indicated by the timer section 4; that is, the accumulating section 5 calculates an accumulated time Tn from the zeroth second toward the last second of the total time value Tt to be counted as well as a subtracted time from the last second toward the zeroth second (Tt−Tn), so as to constantly provide a changing current elapsed time (see FIG. 2). Once the time value accumulated by the accumulating section 5 has reached the predetermined total time value Tt (i.e., once the counting of the seconds for the 100 year period has been completed), the time period renewal section 7 is activated to instruct a renewed time period for subsequently counting by the timer section 4. In this way, the unique time generating device in the computer is updated once for every 100 years.

Each elapsed time measurement yielded by the unique time generating device can be supplied via the I/O device 3 to one or more other computers; conversely, each elapsed time measurement yielded by the other computer can also be supplied via the I/O device 3 to the unique time generating device. As a result, the present invention allows every computer on a network to share a common time recognition or concept which has heretofore not been permitted by the conventional computer-implemented timer devices having registered therein respective local standard times of individual countries in which the computers are to be installed. Further, by positively making different the time-measuring periods to be measured by the individual computers, the time space can differ among the computers and mutual authentication among the computers can be achieved on the basis of the respective accumulated time (unique time measurement) provided by the individual computers, as will be further described hereinafter.

The unique time generating device of the present invention may be incorporated in software installed in the computer used or stored in an IC (Integrated Circuit) chip provided in the computer. Specifically, the unique time generating device in the form of an IC chip may be run by a CPU coupled with a memory. To incorporate such a chip, all the computers manufactured may be preset to a same time-measuring period in such a manner that they continue to concurrently count toward a same measurement ending point of the period to provide same elapsed time measurements; conversely, all the computers manufactured may be set to different time-measuring periods in such a manner that they continue to count toward different measurement ending points to provide different elapsed time measurements.

A description will first be made about the latter case where all the computers manufactured are set to different time-measuring periods in such a manner that they continue to count toward different measurement ending points to provide different elapsed time measurements in a system comprising a plurality of the unique time generating devices of the invention.

Figure 3:
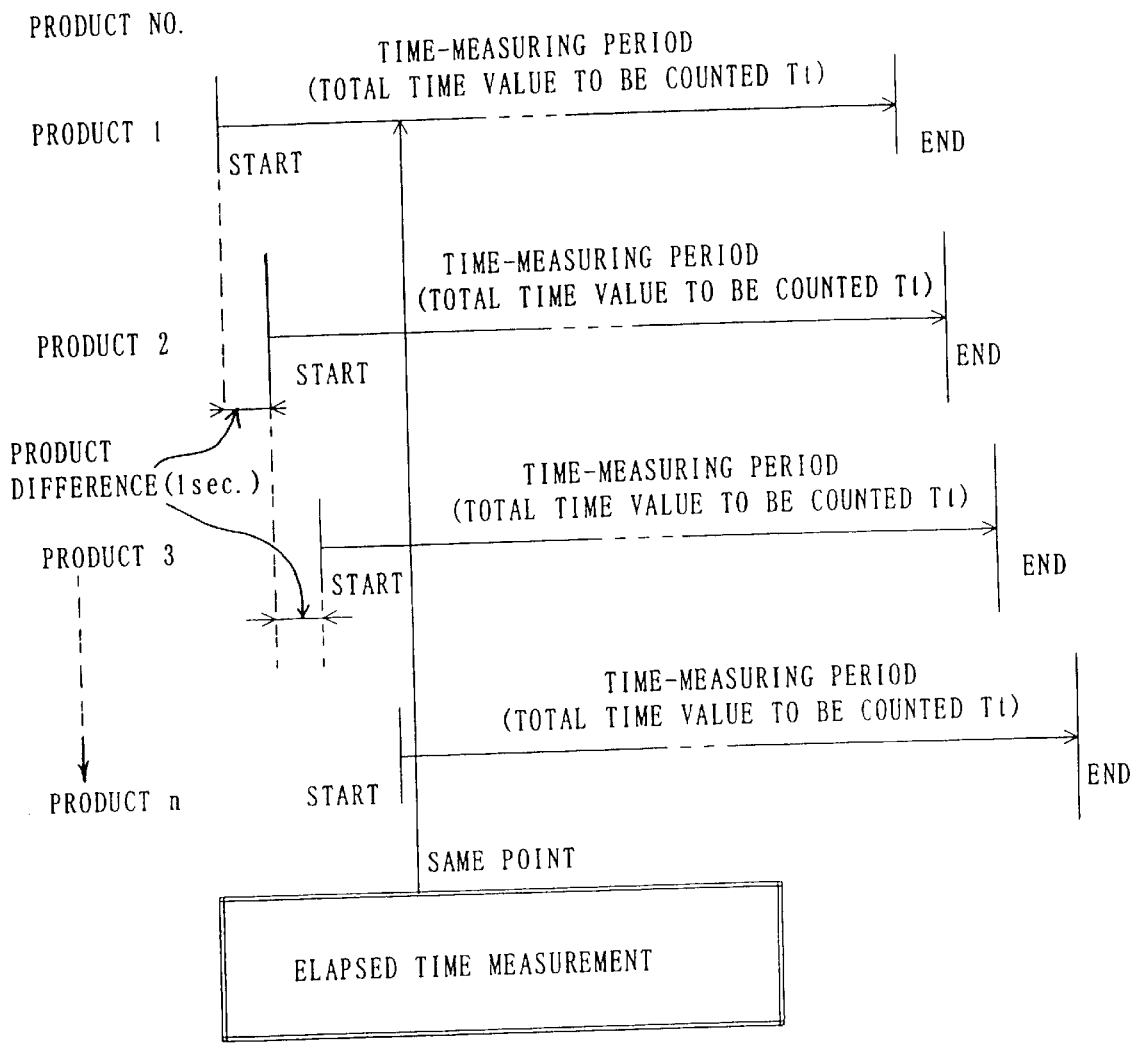
FIG. 3 is a chart showing several time-measuring periods, assigned to a plurality of unique time generating devices, having different starting points.

FIG. 3 shows several time-measuring periods, having different measurement starting and ending points, to be measured by the individual unique time generating devices, each of which is incorporated in an IC chip provided in an associated computer. The unique time generating devices or products (e.g., products 1–3) are sequentially produced, at intervals of, for example, one second, to start and stop counting a same total time value Tt (e.g., 3,155,692,500.97 seconds). Namely, the respective measurement starting points for the products are set in accordance with the production interval (one second) in such a manner that they are displaced from each other by one second; similarly, the respective measurement stopping points are displaced from each other by one second, although the total time value Tt, i.e., the length of the time-measuring period is the same for all the products as more clearly seen in FIG. 4. If the measurement starting point of product 1 is set to 0:00'00".00 a.m., Jan. 1, 2000, Greenwich Mean Time, product 2 will start measuring one second after product 1, product 3 one second after product 2, and so on. Even in the case where the respective measurement stopping points are set to differ from each other as in the example of FIG. 3, the measurement starting points may be set to be the same in such a manner that the respective time-measuring periods of the individual products (IC chips) have different lengths, i.e., different total time values as shown in FIG. 5. Namely, according to this scheme, the manufacturer of the chips or general distributor of given network equipment manages the master equipment (e.g., host computer) of a system comprising a plurality of the unique time generating device so that the generating devices each count the preset total time value Tt of 3,155,692,500.97 seconds for the 100 year period, as shown in FIG. 5.

Next, a description will be made about a system comprising a plurality of the unique time generating devices where the respective computers are programmed to yield a same elapsed time measurement at every point within preset time periods of the same length and hence simultaneously stop the elapsed time measurement.

Figure 7:
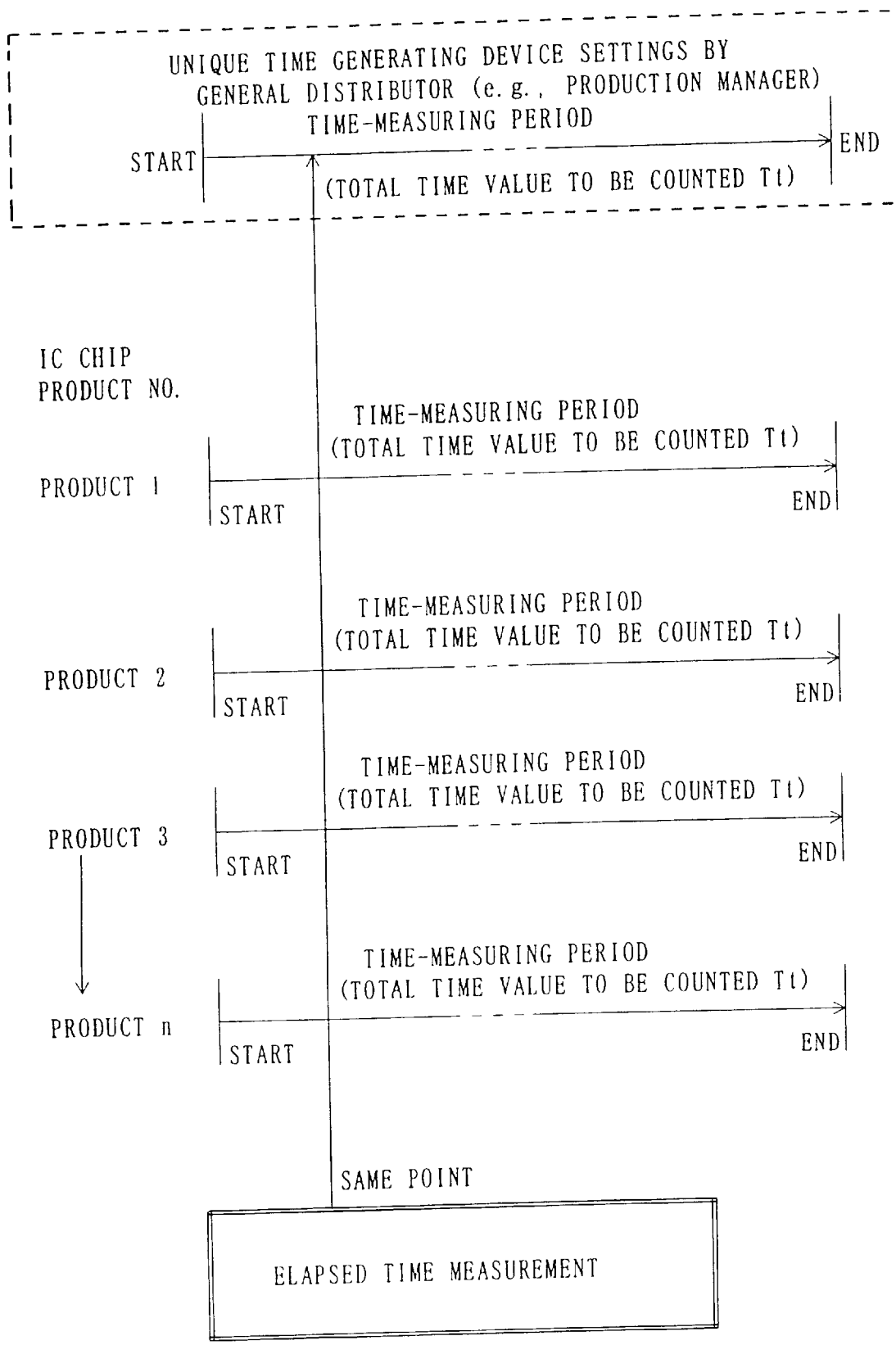
FIG. 7 is a chart showing several time-measuring periods, assigned to a plurality of unique time generating devices.

FIG. 7 shows various time-measuring periods to be measured by the unique time generating devices each incorporated in an IC chip in the computer employed. According to this scheme, the manufacturer of the chips or general distributor of given network equipment manages the master equipment (e.g., host computer) of the system so that the generating devices count the preset total time value Tt of 3,155,692,500.97 seconds for the 100 year period, as shown in FIG. 7. On the other hand, the individual products (products 1, 2 ... n) manufactured on the basis of the master equipment are designed to simultaneously to start the elapsed time measurement, sequentially accumulate unit time values toward the last second of the same total time value Tt and then simultaneously stop the elapsed time measurement.

The measurement starting points of all the products including the master equipment are set to be identical to each other, and apparatuses for manufacturing the above-mentioned products including the master equipment are all activated at a time point when product 1 or all the products are launched for sale. Specifically, in FIG. 8, the measurement starting time is set to 0:00'00".00 a.m., Jan. 1, 2000, Greenwich Means Time. Consequently, all the manufacturing apparatuses for the above-mentioned products and the master equipment are caused to simultaneously start measuring a changing elapsed time within the time-measuring periods of the same total time value Tt as seen in FIGS. 7 and 8. Similarly, all the manufacturing apparatuses for the above-mentioned products and the master equipment are caused to simultaneously stop measuring. As a result, the unique time generating devices in all the chips (including the master) manufactured or sold indicate a same elapsed time at each given point as shown in FIG. 7.

These unique time generating devices, which indicate the same elapsed time at each given point, permit a common time authentication among the computers containing such devices or among equipment connected to the computers. Thus, for example, it is possible to control various pieces of equipment connected to the computers using the time measured by the unique time generating devices, without being adversely influenced by the local standard time of each country concerned, or even at a place remote from the earth's environment. Further, such computers (IC chips) indicating the same elapsed time may be set differently among various user groups, big or small, such as computer makers (manufacturers), network groups (e.g., internet) and network groups within a business firm (intranet). Further, a combined use of the computers counting different time periods permits unique time management which has never existed to date.

Figure 9:
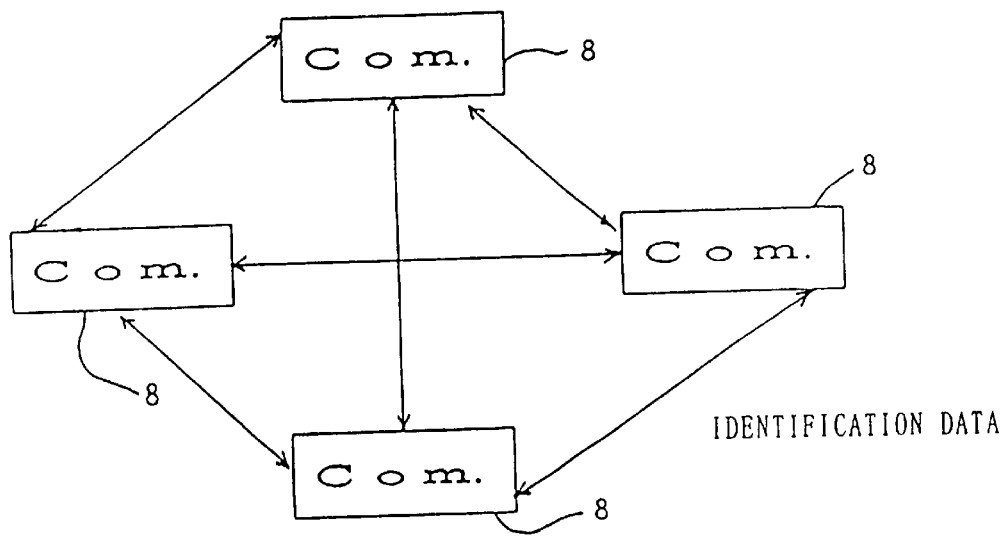
FIG. 9 is a diagram illustrating a manner in which several computers interconnected via a network exchange identification data based on respective elapsed times measured by the computers.

In the unique time generating devices accumulating different time at each point (devices shown in FIGS. 3 to 6), the respective computers will indicate different elapsed time measurements when communication (e.g., network communication) for information or monetary transactions (hereinafter collectively called "transaction") occurs among the computers, so that the unique time generating devices can be used as an authenticating device based on these unique time data. More specifically, because each elapsed time (unique time measurement) provided by a specific one of the computers or other information obtained by processing or scrambling the measured time in accordance with a given rule is not present in any of the other computers at the same point, it can be transmitted as unique identification data of the specific computer relative to the other computers. That is, by installing the devices for measuring different or unique elapsed times in a plurality of computers 8 interconnected via a network as shown in FIG. 9 so as to exchange the unique time measurements among the computers, data communication and transactions can be conducted as if they were based on a one-time password.

Figure 10:
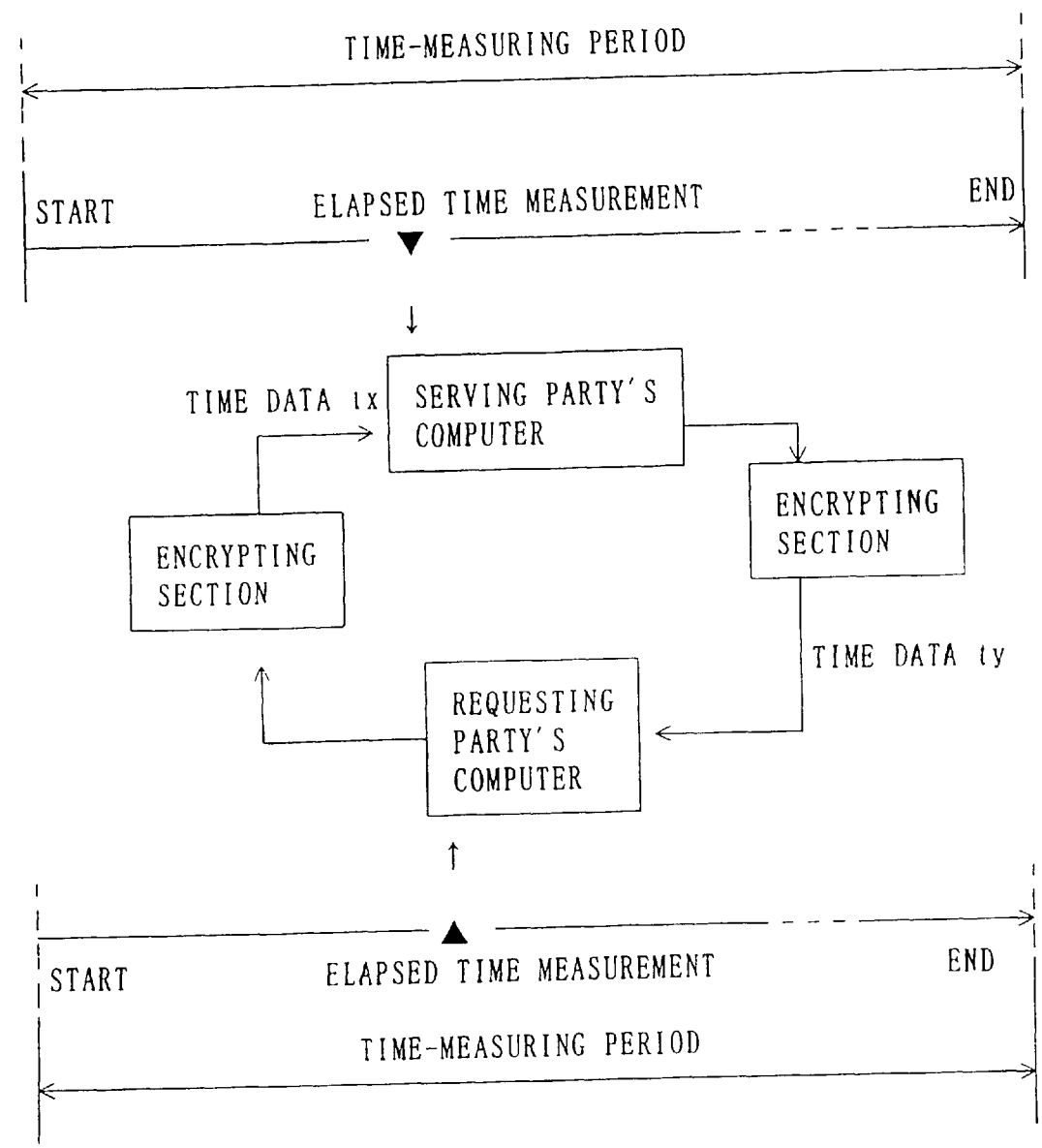
FIG. 10 is a diagram showing a manner in which identification data based on different elapsed time measurements are exchanged between computers of transaction-requesting and transaction-serving parties.

For example, consider a case where transactions or data communication is conducted between two computers of transaction-requesting and transaction-serving parties as shown in FIG. 10. In this case, each of the computers transmits unique elapsed time data tx, ty to the other party's computer, so that the other party's computer can receive and recognize the transmitted time data as identification data. Such identification data may be stored, in both the computers of the transaction-requesting and transaction-serving parties, as a transaction or communication record. The time data tx and ty to be transmitted are set on the basis of the respective unique time measurements and then scrambled or encrypted using a given rule.

Next, a description will be made about a working example of the system comprising the unique time generating devices (FIGS. 7 and 8) which are set to provide a same time measurement at every timing or point. By incorporating therein these unique time generating devices by a plurality of associated computers interconnected via a network, a common time concept can be achieved, throughout respective time-measuring periods, in the computers 8 located in various parts of the world or in artificial satellites 9 located remote from the earth. Namely, these computers sequentially accumulate the same unit time value at the same timing to yield a same unique time measurement, as a result of which intercommunication between the computers is executed on the basis of the same time concept. Thus, for example, it is possible to set a given document, transmitted from Tokyo, to be received in London at a predetermined time with no errors while eliminating time delays in transmission and time difference between the two places. Further, each of the computers 8 measuring a constantly changing current time may be connected with an interface for converting the current measured time into a standard local time of the country concerned, so that input/output of a time is effected on the basis of the standard local time.

Figure 11:
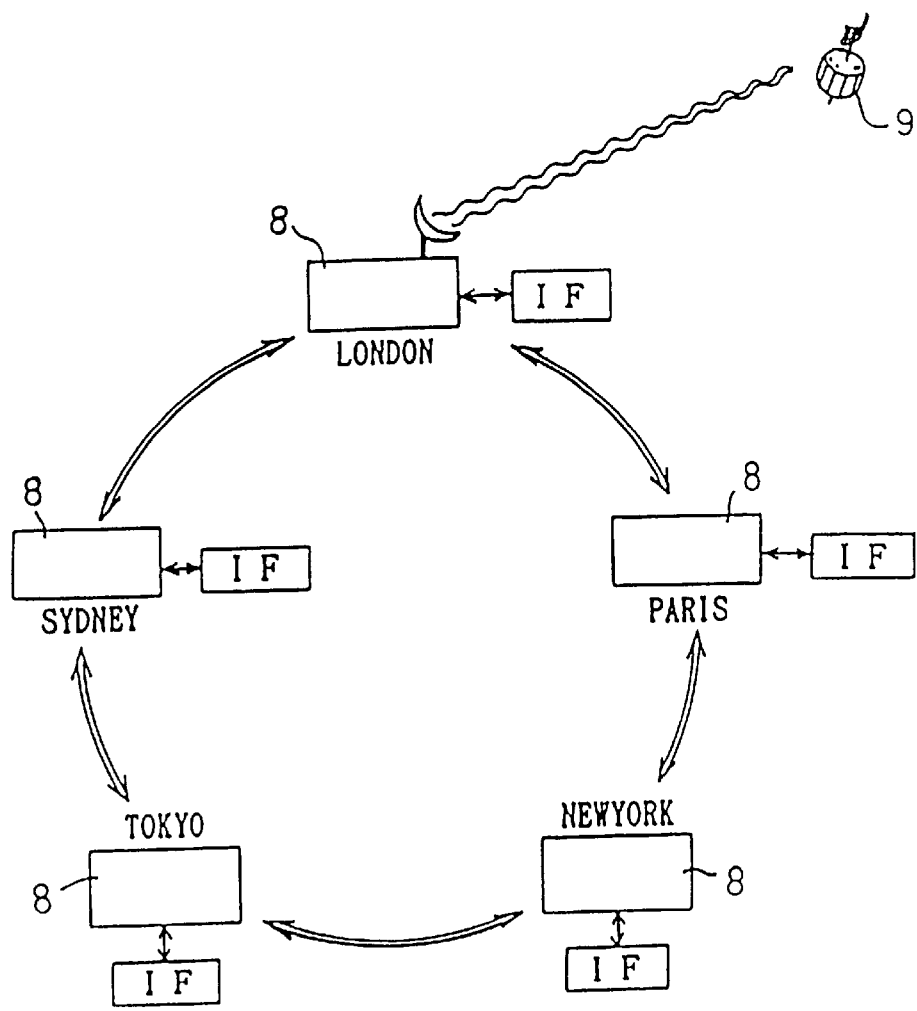
FIG. 11 is a diagram showing a manner in which communication is conducted via a network between computers that implement unique time generating devices located in various countries of the world and set to a same tome-measuring period.
Figure 13:
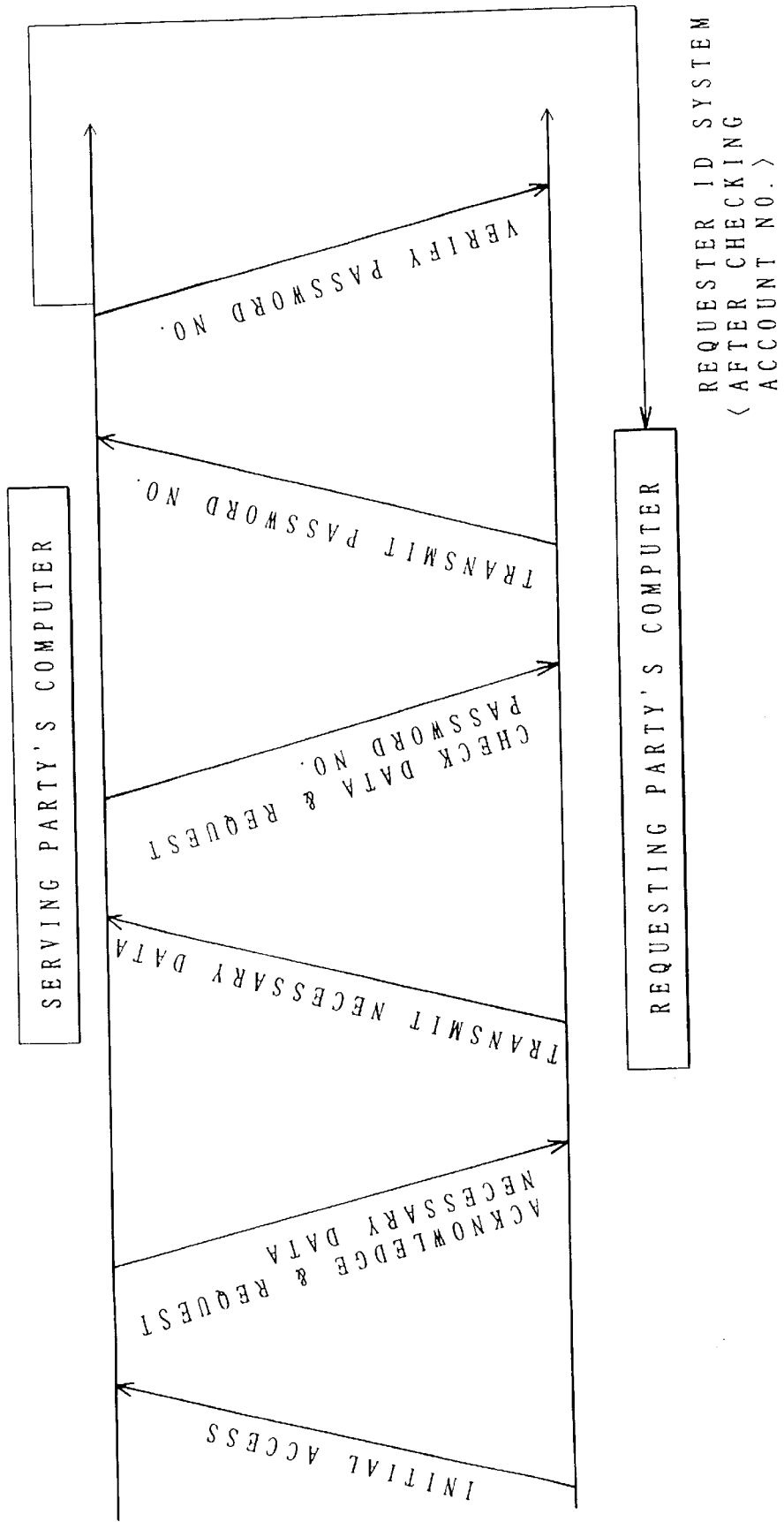
FIG. 13 is a diagram showing transmission and reception in the initial access conducted between the transaction-requesting and transaction-serving parties.

In addition, such unique time generating devices may be incorporated in computers connected via a network or in any other suitable manner so that control equipment or the like connected to one of the computers is remote-controlled on the basis of an instruction from any of the other computers. For example, it is possible to perform control such that a triggering device connected to one computer is activated by a remote computer precisely at a preset future time (e.g., in 8,000 seconds); that is, such control permits the device to trigger explosion at accurate timing with no time delay. Furthermore, control equipment or the like carried in the artificial satellite 9 of FIG. 11 can be remote-controlled on the basis of a time measured by the satellite.

As has been described above, the unique time generating devices and authenticating devices using the unique time generating devices afford a significant benefit that they can set a common or unique time concept between a plurality of computers, smooth a network communication between the computers, and permit mutual authentication between the computers.

EMBODIMENT 1

In recent years, at-home shopping and mail-order business using personal computer or internet line have been replacing those using conventional magazines and television broadcasting. Further, entertainments, such as communication-based karaoke, book-on-demand and video-on-demand, in addition to conventional commodity exchange and supply of stock exchange information, financial information and patent information have become objects of such communication-based transaction.

Further, various sorts of dealers, such as distributors, trading companies, CATV-related companies, communication companies, finance companies, are planning to enter the communication-based transaction (information supply business). These dealers will use a large-scale computer to obtain users' desired information from memory so as to automatically send information or commodities to their client. These dealers may be allowed to uniquely identify one party providing a requested service and another party receiving the service, using unique times measured by the above-described unique time generating device provided within a computer possessed by the dealers.

FIGS. 12 to 16 show various examples of the authenticating device (mutual authenticating device) using unique time measurements generated by one embodiment of the present invention. Respective computers of a transaction-requesting party or client and a transaction-serving party are connected together via a network and both contain unique time generating devices which keep time within different preset time periods as shown in FIG. 3 or 5. First, to execute a communication-based transaction, an initial access (admission procedure) is made between the transaction-requesting party and transaction-serving party (information provider) as shown in (A) of FIG. 12. In the initial access, transmission and reception are conducted between the transaction-requesting party's and transaction-serving party's computers in the order shown in FIG. 13.

The initial access for admission is made from the transaction-requesting party's computer to the transaction-serving party's computer, on the basis of which the transaction-serving party acknowledges receipt of the access and requires necessary data of the transaction-requesting party. The necessary data include the address, name, telephone number, etc. of the transaction-requesting party, its bank account for settlement of outstanding accounts, type and ID No. of the computer used by the transaction-requesting party, etc., and these data are sent from the transaction-requesting party to the transaction-serving party's computer. Then, the transaction-serving party's computer returns the received necessary data to the transaction-requesting party's computer and asks the transaction-requesting party to confirm the necessary data and enter a four-digit password number. Then, the transaction-requesting party sets its arbitrary password number, which is then sent to the transaction-serving party. The transaction-serving party's computer returns the sent password number to the transaction-requesting party for confirmation thereof. This way, the initial access for admission is completed.

Upon completion of the initial access for admission, the transaction-serving party examines the transaction-requesting party's qualifications for admission, on the basis of the transmitted data from the transaction-requesting party. The examination centers on the transaction-requesting party's bank account and balance. Once it has been determined that the transaction-requesting party meets predetermined admission requirements, software of a requester authentication system, i.e., customer authentication system is sent from the transaction-serving party to the transaction-requesting party by registered mail at a later date. The requester authentication system may be recorded on a computer-readable IC card, CD-ROM or floppy disk (FDD), and the transaction-requesting party installs the mailed requester authentication system in its available personal computer.

Figure 14:
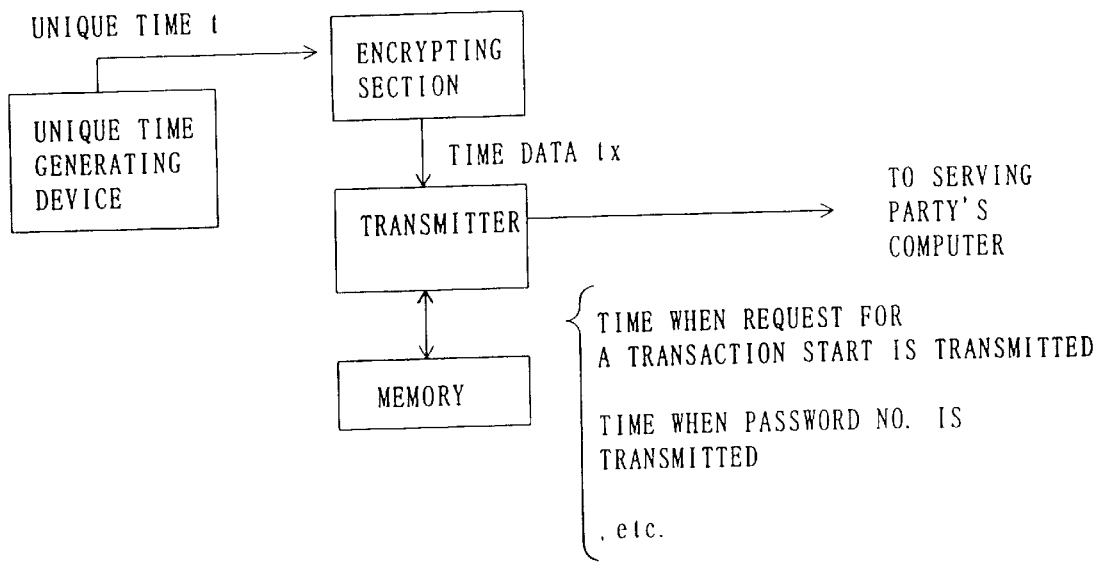
FIG. 14 is a block diagram showing a requester authentication system.
Figure 16:
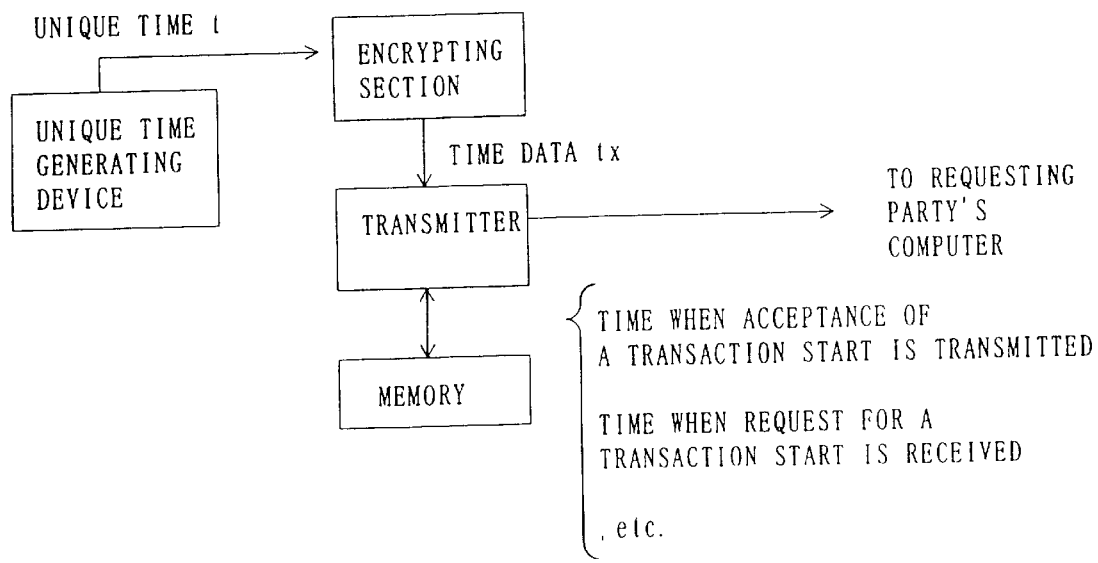
FIG. 16 is a block diagram showing a server authentication system.

As shown in FIG. 14, a unique time measurement from the unique time generating device incorporated in the transaction-requesting party's computer is input to the requester authentication system which is installed in the transaction-requesting party's computer. The authentication system includes an encrypting section for converting or scrambling the unique time measurement t in accordance with given rules, and a transmitter for transmitting converted time data tx from the encrypting section to the transaction-serving party's computer at predetermined timing. Further, the requester authentication system includes a memory for storing the time data tx in such a manner that the data is retrieved in response to an instruction from the transmitter.

The following paragraphs describes a manner in which the transaction-requesting party's computer accesses the transaction-serving party's computer for executing a communication-based transaction. First, the transaction-requesting party uses its own personal computer, having the system installed therein, makes a request to the transaction-serving party's computer for initiation of a transaction. This request can be effected by the transaction-requesting party entering its password number in response to an instruction (visual instruction on a CRT) issued from the system with the respective computers of the transaction-requesting party and transaction-serving party connected with each other, as shown in (C) of FIG. 12. The entry of the transaction-requesting party's password number activates the requester authentication system of FIG. 14, so that the transmitter of the system stores in the memory time data tx (indicative of, for example, time A) set on the basis of a unique time measurement t recognized by the transaction-requesting party's computer in corresponding relation to the entered password number. The transmitter also transmits the time data txA to the transaction-serving party's computer. The transaction-serving party's computer recognizes the time data txA as a password for authenticating the transaction-requesting party in a future transaction and retains the time data txA along with other data of the transaction-requesting party ((C) of FIG. 12).

Figure 15:
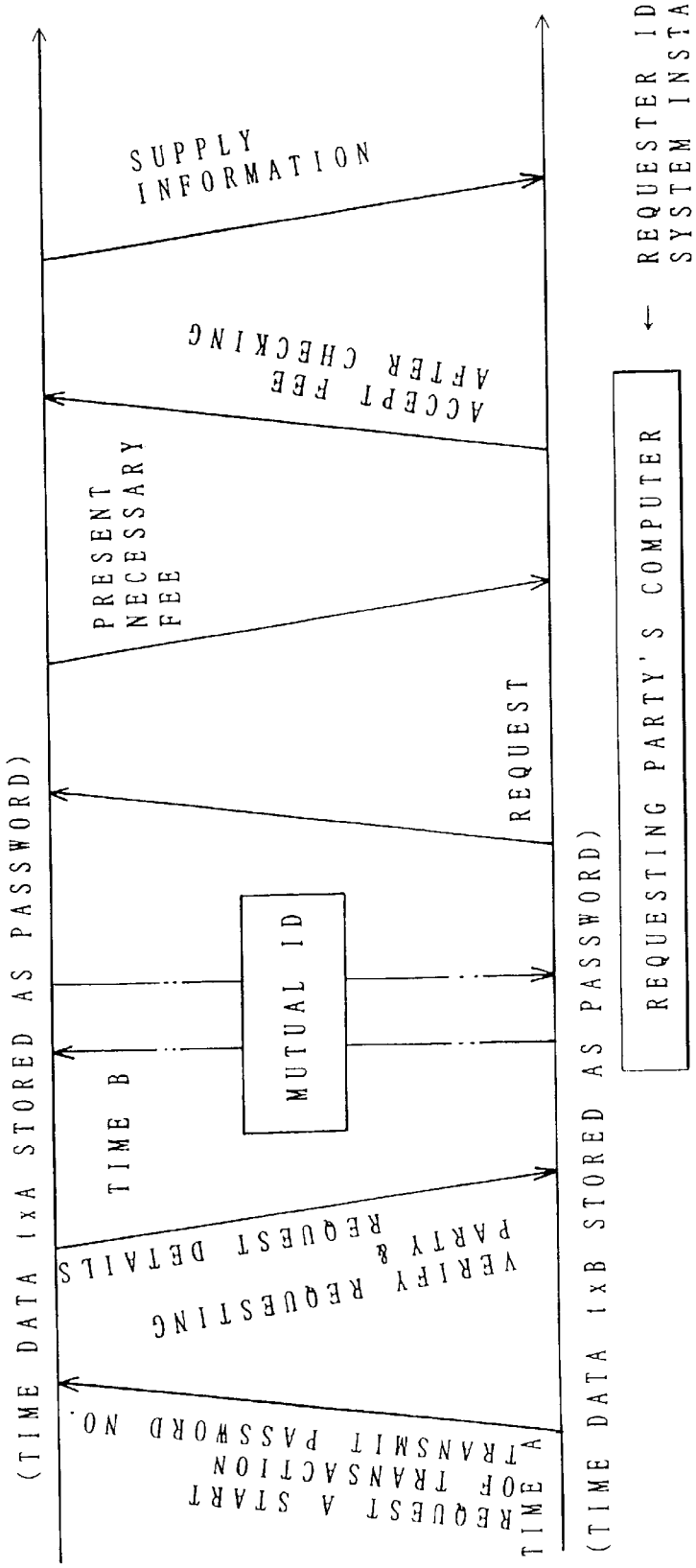
FIG. 15 is a diagram showing transmission and reception in the transaction access conducted between the transaction-requesting and transaction-serving parties.

Then, the transaction-serving party's computer asks the transaction-requesting party's computer about the detail of the request, as shown in FIG. 15. In response to this, the transaction-requesting party, for example, makes a detailed request for "documents of annual accounts in the years of 1990 to 1995 for xxx, inc." if the transaction-serving party is a provider of company information. In response to the detailed request, the transaction-serving party's computer presents an amount of cost for proving the requested information to the transaction-requesting party, who in turn replies with a message that the cost has been found acceptable as shown in FIG. 15. After such transmission and reception, the transaction-serving party provides the requested information on the annual accounts.

On the other hand, a server authentication system is pre-installed in the transaction-serving party's computer. The server authentication system includes an encrypting section for converting or scrambling a recognized unique time measurement t, yielded by the unique time generating device incorporated in the computer, in accordance with given rules, and a transmitter for transmitting converted time data tx from the encrypting section to the transaction-requesting party's computer at predetermined timing. For example, the transmitter transmits time data txB which comprises time data tx indicative of, for example, time B yielded when the transaction-serving party acknowledged the content of the transaction-requesting party's request, and the transaction-requesting party's personal information (such as the transaction-requesting party's date of birth and password number). The time data txB is also stored into a memory of FIG. 16. The transaction-requesting party's computer recognizes the time data txB as a password for authenticating the transaction-serving party, from among many others, in a future transaction and retains the time data txB ((C) of FIG. 12).

In the above-described manner, time data txB indicative of time B yielded on the basis of a given unique time measurement t of the transaction-serving party's computer and time data txA indicative of time A yielded on the basis of a given unique time measurement t of the transaction-requesting party's computer are retained by the transaction-requesting party's computer and transaction-serving party's computer, respectively, in an alternate fashion, as passwords authenticating the other party, i.e., transaction-serving party or transaction-requesting party (see (C) of FIG. 12). The transaction-requesting party is allowed to record the password time data txB on an IC card, floppy disk (FD) or the like, while the transaction-serving party's computer stores the time data txA in the memory along with the transaction-requesting party's other data. As shown in FIG. 15, the passwords authenticating the transaction-requesting party and transaction-serving party are alternately exchanged between the transaction-requesting party and transaction-serving party, in data transmission and reception between the parties, as a preliminary step of the actual transaction (request), so that the passwords are automatically collated with reference data stored in the respective memories so as to be ascertained for their authenticity. If the authenticity is not confirmed by the server's computer, a next actual transaction communication is not allowed.

According to the mutual authentication system in the communication-based transaction, each of the transaction-requesting party's and transaction-serving party's computers is equipped with the unique time generating device so that encrypted time data tx is provided, every desired transaction, on the basis of a unique time measurement t yielded by the generating device. The time data is transmitted to the other party's computer to be used as a password (a sort of a one-time password based on the unique time measurement). Each password is not known even to the corresponding transmitting party, because it is encrypted and retried and transmitted from the memory at arbitrary timing in the requester authentication system or server authentication system.

Further, because each password is produced on the basis of a different unique time measurement yielded by the unique time generating device, no same password is allocated to two or more requesting parties even when there are numerous requesting parties. Such a system affords very superior security, because it can be used only in a specific computer via an IC card, floppy disk or the like and activated only on the basis of a password number entered by the transaction-requesting party. Thus, in transactions based on communication via a network where the other party is invisible, the transaction-requesting party and transaction-serving party can be identified reliably and safely.

According to the above-described embodiment, the transaction-requesting party and transaction-serving party alternately transmit password time data. However, in general, the password used by the transaction-requesting party to authenticate the transaction-serving party is not so necessary, and it is only necessary that the transaction-requesting party's computer contain a requester authentication system as shown in FIG. 14. Namely, it is only necessary that a password be transmitted to the transaction-serving party for storage therein on the basis of such a system and then the transaction-requesting party transmit time data to the transaction-serving party for storage therein at a subsequent substantive transmission/reception for transactions. The server authentication system may be set such that the transaction-serving party's computer collates the transmitted data and the data to be stored and, if the two data match each other, proceeds to the substantive communication-based transactions.

Further, according to the above-described embodiment, time data tx is generated on the basis of a unique time measurement t determined by the transaction-requesting party's or transaction-serving party's unique time generating device and is then transmitted to the other party's computer for storage therein. Alternatively, as shown in (A) of FIG. 17, the transaction-serving party's computer provided with the unique time generating device may use a unique time measurement t based on a start of transactions, such as a particular time when a request for the start of transactions is received by the transaction-serving party's computer or when the password number is identified by the transaction-serving party's computer, after the transaction-requesting party's computer accesses the transaction-serving party's computer. More specifically, the transaction-serving party's computer may conduct encryption on the basis of its optionally determined unique time measurement t (e.g., time E) and generate time data txE in corresponding relation to other transaction-requesting party's data (see (A) of FIG. 17). The thus-generated time data txE is stored in the memory of the transaction-serving party's computer and also sent to the transaction-requesting party's computer for storage therein. Then, at a subsequent transaction, the time data txE is transmitted from the transaction-requesting party's computer to the transaction-serving party's computer at given timing (before the substantive transactions begin as in the case of FIG. 15), which in turn can recognize the time data txE as a password for authenticating the transaction-requesting party.

Figure 17:
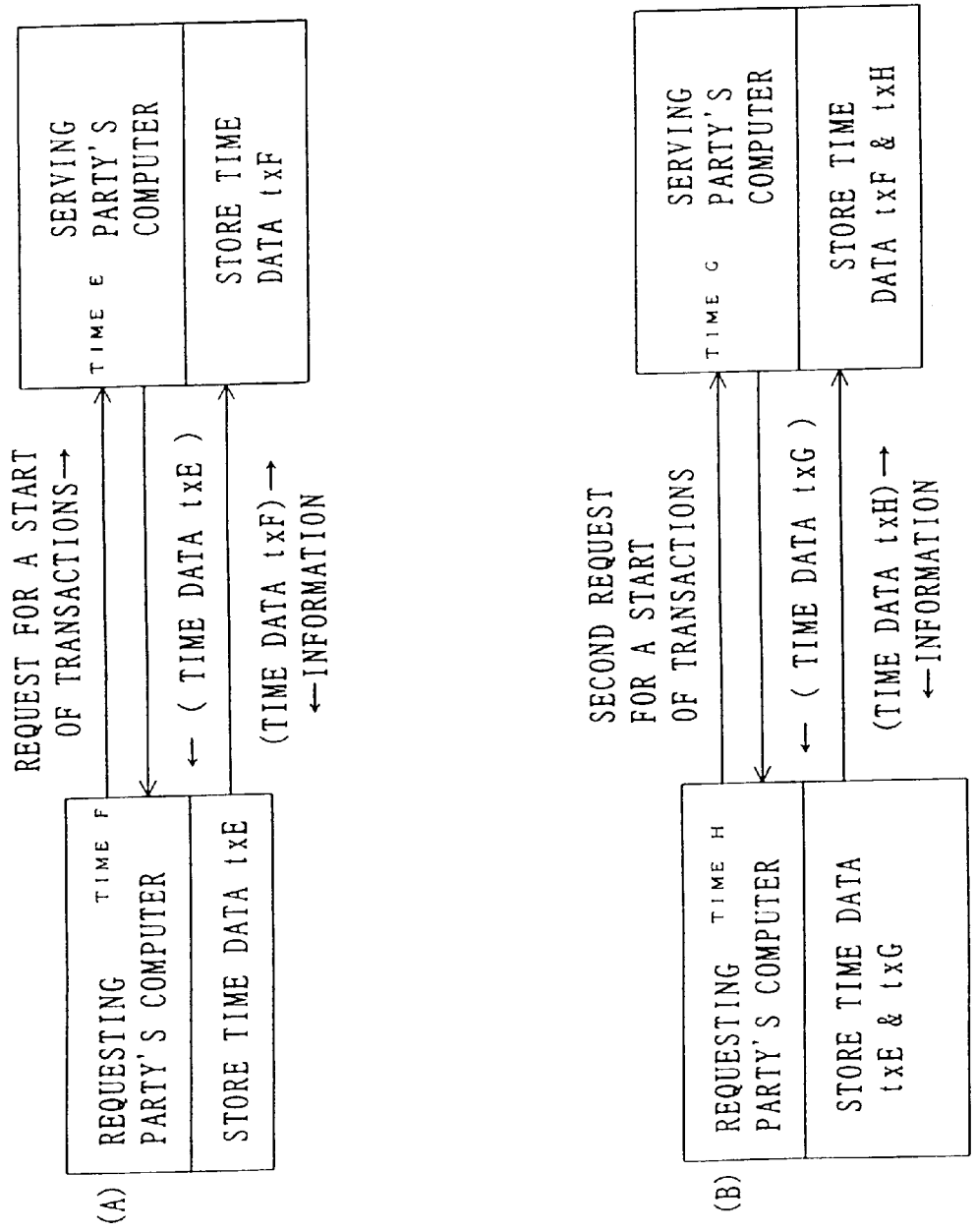
FIG. 17 is a diagram showing transmission and reception conducted between transaction-requesting and transaction-serving parties in an authenticating device using unique time generating devices according to an embodiment of the present invention.

In addition to this, as shown in (A) of FIG. 17, the transaction-requesting party's computer provided with the unique time generating device may use a unique time measurement t based on a start of transactions, such as a particular time when a request for the start of transactions or content of the request is accepted by the transaction-serving party's computer, after the transaction-requesting party's computer accesses the transaction-serving party's computer, when the transaction-serving party's computer accesses the transaction-requesting party's computer. Namely, the transaction-requesting party's computer may conduct encryption on the basis of its optionally determined unique time measurement t (e.g., time F) and generate time data txF in corresponding relation to the password number (see (A) of FIG. 17). The time data txF is stored in the memory of the transaction-requesting party's computer and also transmitted to the transaction-serving party's computer for storage therein. Then, at a subsequent transaction, the thus-generated time data txF is transmitted from the transaction-serving party's computer to the transaction-requesting party's computer at given timing (before the substantive transaction begins as in the case of FIG. 15), which in turn can recognize the time data txF as a password for authenticating the transaction-serving party.

(D) of FIG. 12 shows a case where the transaction-requesting party sends a second request for transactions (information) to the transaction-serving party at a given point after execution of the initial transaction as described above. Namely, in this case, mutual authentication between the requesting and serving parties is conducted on the basis of time data txB and txA stored in the requesting and serving parties, respectively, at the last transaction. At the current transaction as well, time data txC and txD are generated in the requesting and serving parties, respectively, on the basis of a unique time measurement (based on time C or D) indicated by the transaction-requesting party's or transaction-serving party's unique time generating device. Each of the thus-generated time data is sent to the other party's computer as additional data to be added to the previously generated time data, so that a combination of the time data txB and txD is formed and stored in the requesting party's computer and a combination of the time data txA and txC is formed and stored in the transaction-serving party's computer. Namely, for each of these successively executed transactions, the other party to the transactions can be identified with increased accuracy by accumulatively storing and updating/generating the time data (by using the time data as a one-time password). Further, in these successively executed transactions, new time data may be updated/generated at the requesting and serving parties by selecting or extracting time data generated at the individual transactions (e.g., by combining the time data of every odd-numbered transaction or convoluting the time data of every fifth transaction).

(B) of FIG. 17 shows a similar case where the transaction-requesting party sends a second request for transactions (information) to the transaction-serving party at a given point after execution of the initial transaction as described above in relation to (A) of FIG. 17. Namely, in this case, mutual authentication between the requesting and serving parties is conducted on the basis of time data txE and txF stored in the requesting and serving parties, respectively, at the last transaction. At the current transaction as well, time data txG and txH are generated in the requesting and serving parties, respectively, on the basis of a unique time measurement (based on time G or H) indicated by the transaction-requesting party's or transaction-serving party's unique time generating device. Each of the thus-generated time data is sent to the other party's computer as additional data to be added to the previously generated time data, so that a combination of the time data txE and txG is formed and stored in the requesting party's computer and a combination of the time data txF and txH is formed and stored in the transaction-serving party's computer. Namely, for each of these successively executed transactions, the other party to the transactions can be identified with increased accuracy by accumulatively storing and updating/generating the time data. Further, in these successively executed transactions, new time data may be updated/generated at the requesting and serving parties by selecting or extracting time data generated at the individual transactions (e.g., by combining the time data of every odd-numbered transaction or convoluting the time data of every fifth transaction).

Further, when the mutual authentication such as shown in FIG. 15 is to be done in the above-described embodiment, the software at the requesting and serving parties may be set in such a manner that they are allowed to proceed to communication for desired substantive transactions only after all the time data are exchanged therebetween and the password (time data txB) transmitted from the transaction-requesting party and password (time data txA) transmitted from the transaction-serving party coincide with each other. More specifically, desired communication-based substantive transactions may be initiated, only after each of the parties stores a sum of different value data (txB+txA) received from the other party, then transmits definite value data at subsequent transactions and then determines that a sum of the transmitted values coincide with the sum stored in the memory.

Further, in the above-described embodiment, the unique time measurement t may be any of the following:

(1) when a request for a transaction start is transmitted from the transaction-requesting party to the transaction-serving party;

(2) when a password number is transmitted from the transaction-requesting party to the transaction-serving party;

(3) when acceptance of the request for a transaction start is transmitted from the transaction-serving party to the transaction-requesting party;

(4) when the request for a transaction start from the transaction-requesting party is received by the transaction-serving party;

(5) when order access is made;

(6) amount-of-money information is transmitted;

(7) the amount-of-money information is received;

(8) a message confirming ordered content is transmitted;

(9) the message confirming ordered content is received; and

(10) a predetermined time (five seconds) after time data as a password is received.

EMBODIMENT 2

Today, along with rapidly increasing use of personal computers, a variety of application software products are on the market, and makers of such application software products require that the application software, in principle, be installed and used only in a user's single computer. As a measure to prevent application software from being installed in a plurality of computers without authorization from the maker, the maker has been asking the user to enter a maker-set ID number or user-set password at the time of installation of the application software. However, this measure can not properly work in a situation when the user intentionally or inadvertently lets out the ID number to another person. Further, in some cases, a user purchases a single item of computer software and install the same computer software in two or more computers, which would result in a great loss to the software maker.

Recently, as a measure to prevent such unauthorized installation of the computer software, it has been proposed to connect some hardware attachment to the respective interface of computers. But, connecting the hardware attachment would normally cost about 20,000 to 50,000 Japanese Yen, and such cost, in effect, can not be tolerated by the maker, thus making the proposed measure impracticable.

Further, under the current OS environment such as provided by Microsoft Windows3.1 or windows95, it is practically impossible or difficult to connect the above-mentioned hardware attachment to a computer interface, and it has been difficult to employ this sort of unauthorized-installation preventing measure in an open computer environment.

In addition, some of the computer users today may, by themselves, create new software, modify existing software, create their own confidential or personalized information, or created various numerical data, using their personal computers. In most cases, the thus-created information is stored into an external storage medium such as a MD (Mini Disk) or floppy disk (FDD) or hard disk of the computer used. But, the information temporarily stored on the floppy disk may be easily accessed by an unauthorized other person to be read into the other person's computer unless the floppy disk is maintained under sufficient management, as shown in (A) of FIG. 27. Also, the information temporarily stored on the floppy disk may be used or freely copied for sale by another person's computer, as shown in (B) of FIG. 27. Besides, as shown in (C) of FIG. 27, when an unauthorized other person unfairly obtains a triggering password or access password for a computer, the other person may easily obtain the created information by accessing the user's computer via a network and even copy the created information into his or her own FDD.

The second embodiment of the present invention is directed to providing a solution to the above-discussed inconveniences encountered by the conventional techniques. More specifically, in order to use the unique time generating device of the invention to authenticate a computer that is authorized to use specific computer software, the second embodiment is arranged to limit, by an inexpensive means, computers where the computer software can be installed, and also arranged to easily prevent from any unauthorized other persons from using information created by a specific computer.

The following is a detailed description about the second embodiment. FIGS. 18 to 21 show an authentication device which is designed to use the unique time generating device of the invention to prevent unauthorized installation of computer software.

Today, in most cases, one or more software application programs to be installed in a personal computer are stored on a storage medium such as a floppy disk (FDD), mini disk (MD) or CD-ROM. Like such software application programs, the authentication device in accordance with the second embodiment may be incorporated in software stored on a storage medium such as a floppy disk, mini disk, IC card or writable or write-once type optical disk. As an example, the authentication-device-containingn software may be stored as a to-be-installed program on a floppy disk separately from the floppy disk storing the application programs, as shown in (A) of FIG. 20.

Alternatively, the to-be-installed program may be stored on a single floppy disk together with the application programs, as shown in (B) of FIG. 20. In each of the options of(A) and (B) of FIG. 20, the application programs and to-be-installed program are used exclusively on a specific computer and the to-be-installed program is set in the computer prior to the application programs. Namely, even with same software made by a same maker, there is only one set of the application programs and to-be-installed program which can authenticate each other and can be installed in a successive manner.

Figure 18:
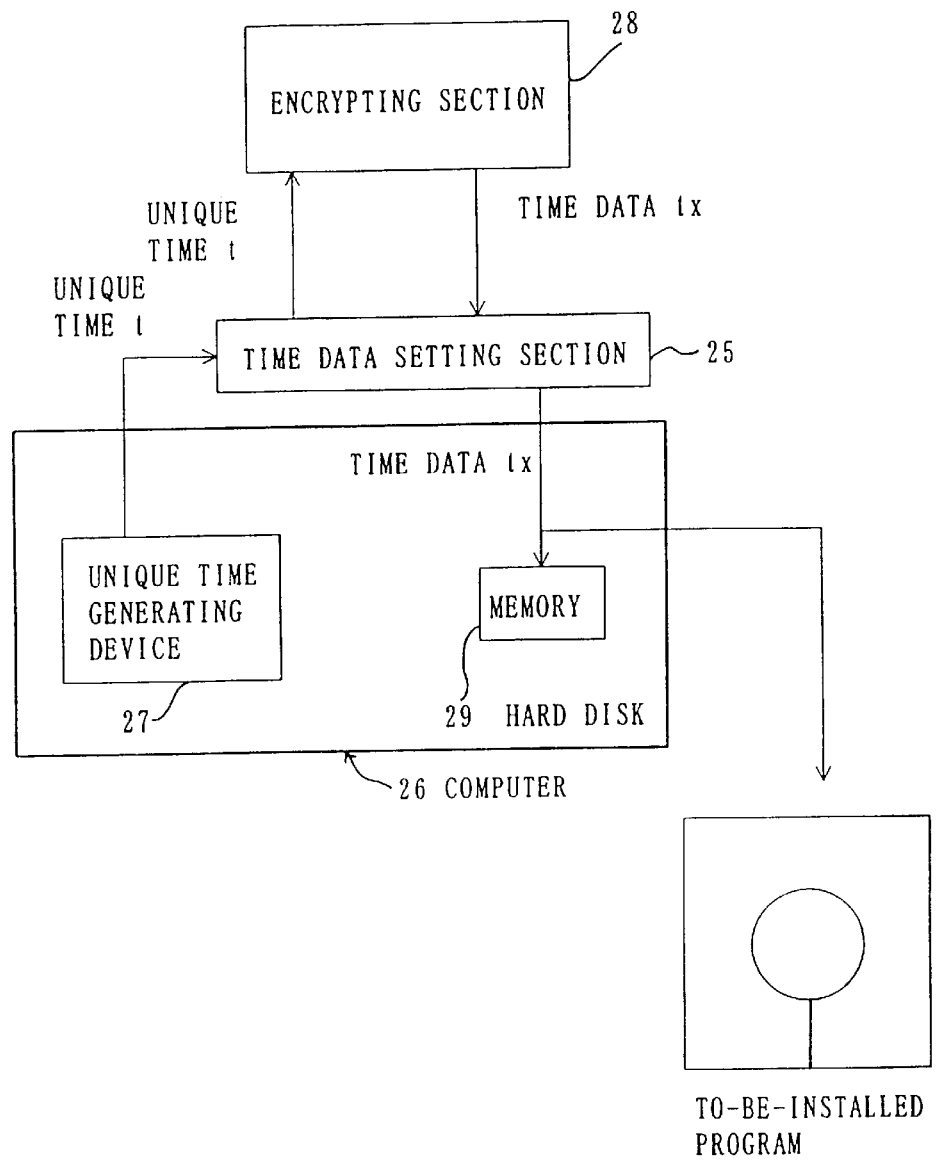
FIG. 18 is a block diagram showing exemplary operation of a time data setting section in an authenticating device using unique time generating devices according to a second embodiment of the present invention.
Figure 19:
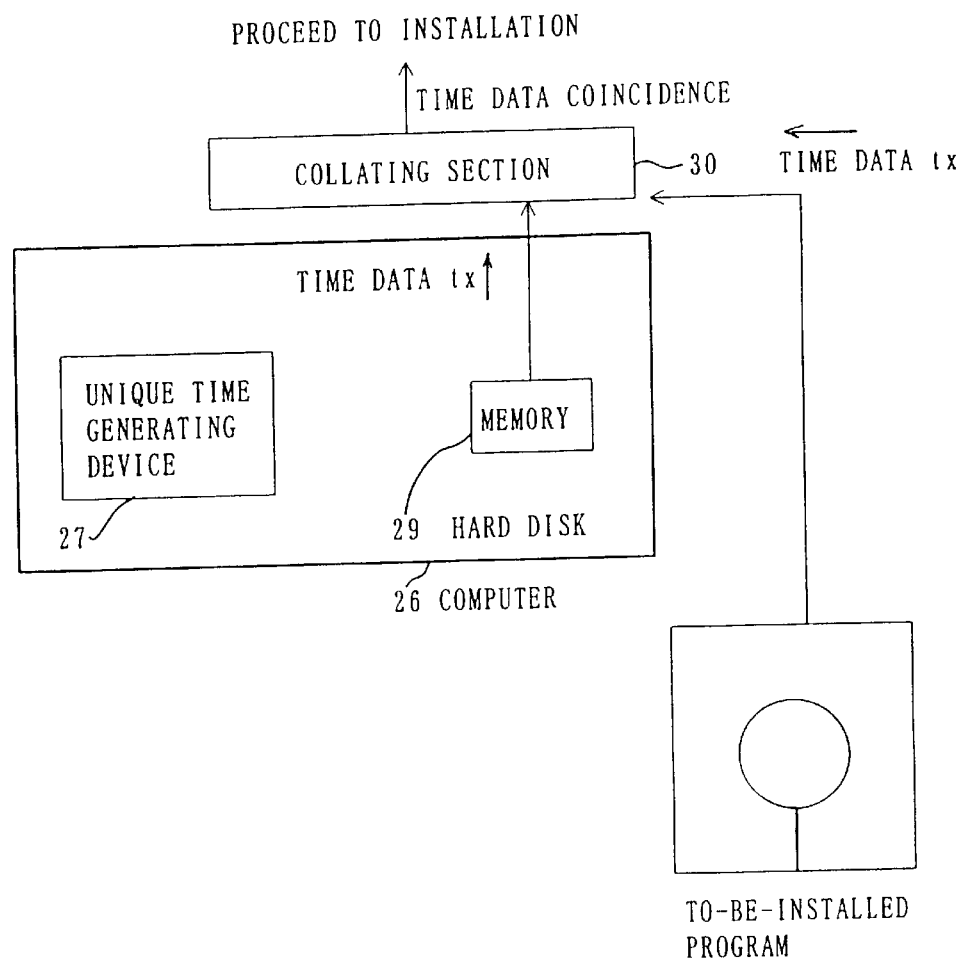
FIG. 19 is a block diagram showing exemplary operation of a time data collating section in the authenticating device of FIG. 18.

The authentication device incorporated in the to-be-installed program is configured in the manner as shown in FIGS. 18 and 19. As shown in FIG. 18, the authentication device includes a time data setting section 25 (time data storage section). After a floppy disk storing the to-be-installed program is inserted to be set properly in a disk drive of a computer 26 in question, this time data setting section 25 receives a unique time measurement t from a unique time generating device 27 of the computer 26 at an optional time prior to initiation of necessary installation operations. The "optional time" may, for example, be any one of the following:

(1) a time point when the FDD is set in the disk drive; (2) a predetermined time (e.g., 10 seconds) after the FDD is set in the disk drive; (3) when entry of the ID number is completed; (4) when the user's name is entered; and (5) an algorithm on a predetermined line of the maker-set to-be-installed program from the FDD. Which of such times should be set as the unique time measurement t is predetermined in the time data setting section 25 and is treated as a so-called "black box" that can be analyzed by the user.

The time data setting section 25 operates as shown in a flowchart of FIG. 21. Once an optional unique time measurement t to be set is received from the unique time generating device 27 at step S1, the time data setting section 25 forwards the received time t to an encrypting section 28 at step S2. Then, at step S3, the encrypting section 28 scrambles and encrypts numerical value data based on the unique time measurement under a predetermined rule. This way, the optional unique time measurement is converted into time data tx. The converted time data tx is fed back to the time data setting section 25 at step S4, which in turn stores the fed-back time data tx at respective predetermined locations in a memory 29 (e.g., hard disk) of the computer 26 and the to-be-installed program at step S5.

In this manner, the time data tx is stored in the memory 29 of the computer 26, so that a specific computer where the application program in question should be installed is determined on the basis of the time data tx. Namely, the authentication device incorporated in the to-be-installed program is provided with a time data collating section 30, which, at an optional time while proceeding with subsequent installation of the installed and application programs, retrieves and collates the time data tx from the respective predetermined locations of the memory 29. Only when the two retrieved time data tx match with each other, the specific computer where the computer software should be installed is identified and then the necessary installation is effected on the specific computer.

According to the present embodiment arranged in the above-described manner, during installation of the software, the specific computer 26 and computer software authenticate each other so that the specific computer where the software should be installed is determined. As a consequence, when the computer software is installed in another computer, an installation error can be detected by collating the time data. This effectively prevents unauthorized installation and utilization of the computer software. On the other hand, the authorized user is allowed to reinstall the software because the two data are determined by the time data collation to match each other.

Recently, with the advancement of computer networks, it has been proposed to provide desired computer software to a user via a communication line. In such a proposed scheme, the user first transmits an optional unique time measurement t of a specific computer to a transaction-serving party's computer, which in turn sets time data tx by means of the time data setting section 25 of FIG. 18 on the basis of the transmitted unique time measurement t. The thus-set time data tx is stored into the transaction-serving party's computer memory along with users other personalized information, such as the user's name, address, ID number and account number, and is also sent to the user's computer memory for storage therein. It is desirable that the time data tx be sent to the user along with other infirmation (installation information) and treated as a black box that can not be analyzed by the user.

During transmission of the to-be-installed program and application programs from the transaction-serving party, the time data tx stored in the user is randomly transmitted to the transaction-serving party in response to the user depressing a predetermined key or clicking a mouse (e.g., when the user operates a return key at a specific step during the access), as shown in (B) of FIG. 22. Then, the transaction-serving party collates the transmitted time data tx by means of the collating section 30, and proceeds to subsequent transmission of installation data if it is determined that the two time data tx match with each other. Alternatively, such transmission of the to-be-installed and application programs may be conducted at a later date, after the user's payment of the compensation for the service has been confirmed by the server. At that time, the mutual authentication (collation of the time data) may be done on the basis of the time data set at the time of the request for the service.

Whereas the second embodiment has been described as setting the time data using a single optional unique time measurement indicated by the unique time generating device in a specific computer where the software computer is installed, the time data tx may be set by selectively extracting one of a plurality of times, such as one when a floppy disk was inserted in the disk drive, one when a specific key (e.g., return key) was depressed and one when the user's name was entered, or combining these times. Further, with the individual computers provided with unique time generating devices which are set to yield different unique time measurements as shown in FIGS. 3 to 5, all the users or serving parties are allowed to conduct a unique and reliable authentication.

EMBODIMENT 3

Figure 23:
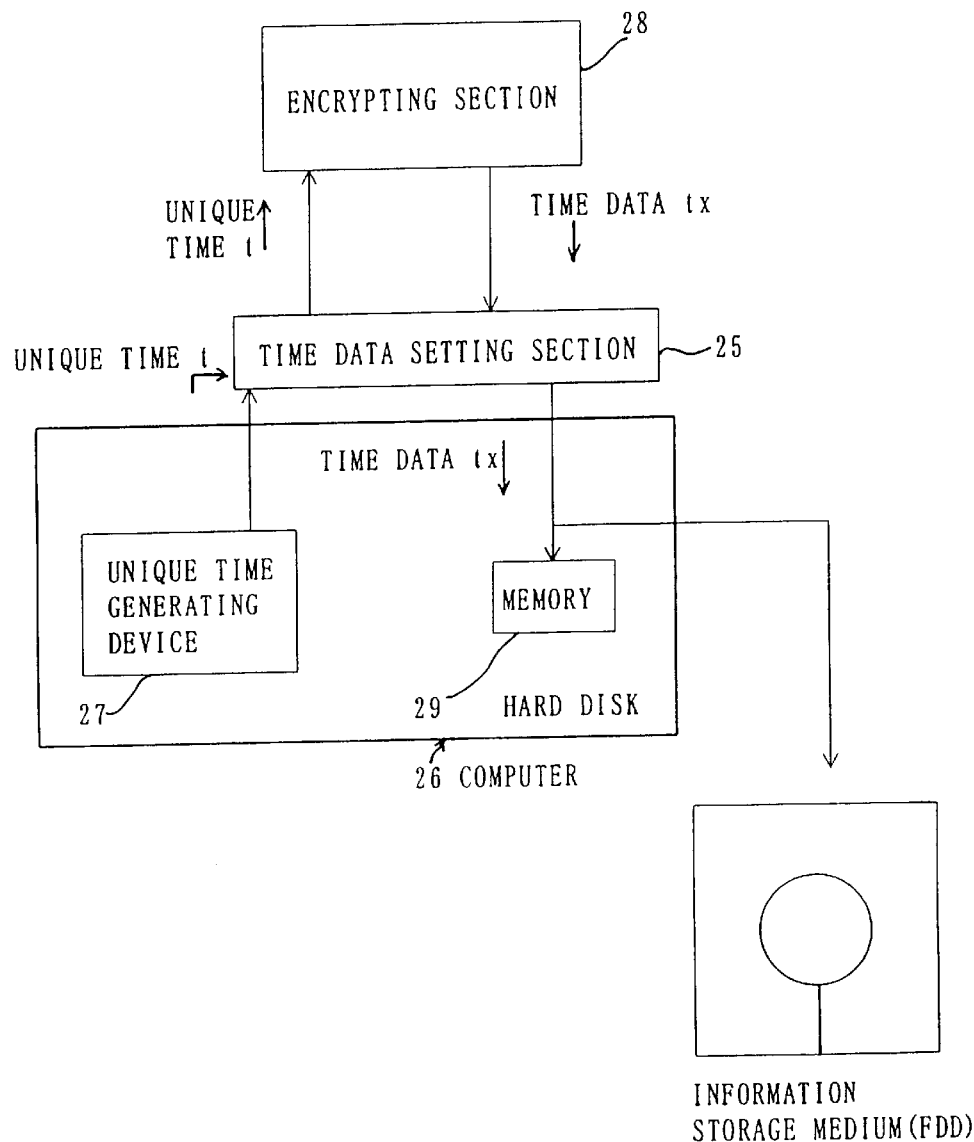
FIG. 23 is a block diagram showing exemplary operation of a time data setting section in an authenticating device using unique time generating devices according to a third embodiment of the present invention.
Figure 24:
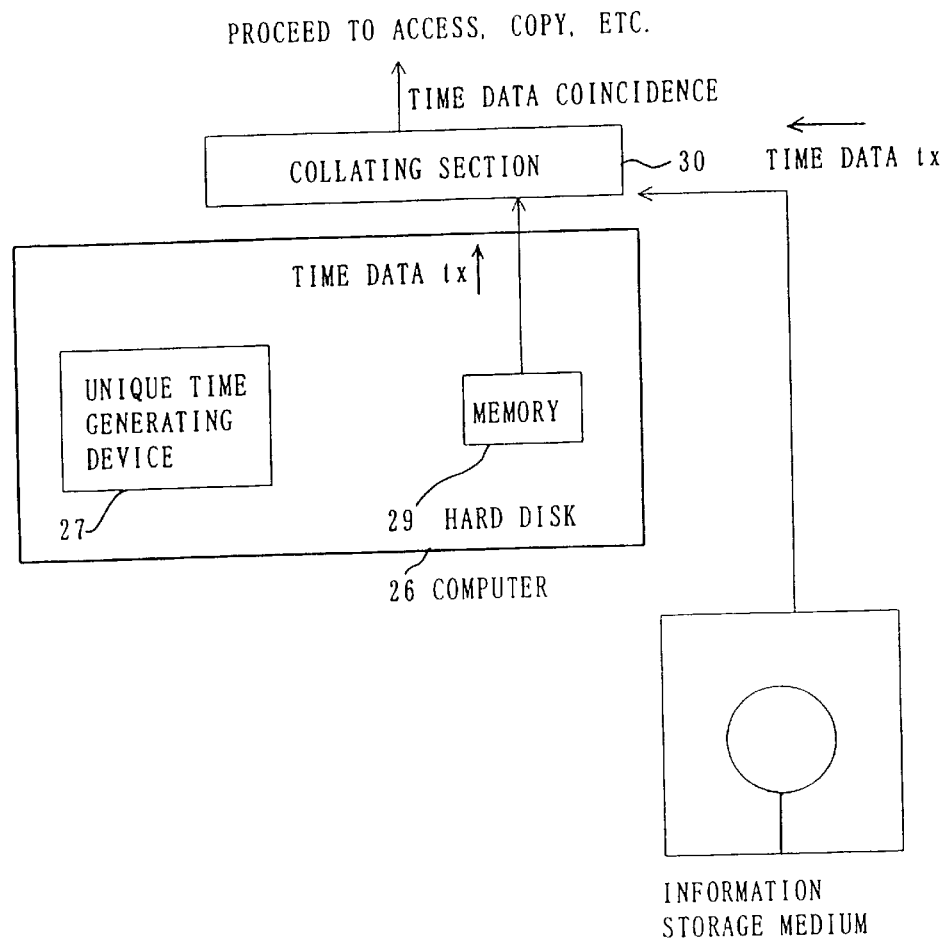
FIG. 24 is a block diagram showing exemplary operation of a time data collating section in the authenticating device of FIG. 23.

Now, with reference to FIGS. 23 and 24, a description will be given below about an authenticating device using the unique time generating device, according to an embodiment of the present invention, which is directed to preventing unauthorized use of computer-made information. Examples of the computer-made information may include computer software, personalized information, customer list, experimental data, accounting data, and confidential information that must not be leaked to any third persons. In most cases, such computer-made information is temporarily stored into a hard disk of the computer in question, floppy disk, mini disk, IC card or writable or write-once type optical disk, which, in the past, could be easily copied and utilized in a third or unauthorized person's computer. To eliminate the inconvenience, the authenticating device according to the embodiment is provided with a time data setting section (time data storage section) shown in FIG. 23 and a time data collating section shown in FIG. 24. The authenticating device is incorporated in computer software that may be contained in a hard disk of a specific computer, or an external storage medium such as a floppy disk or CD-ROM.

The time data setting section 25 sets time data tx for information made by a specific computer 26 during or after the making of the information, and the section 25 stores the time data tx and the information together on a storage medium such as a floppy disk. For example, where the computer-made information is text data entered via a word processor, the time data setting section 25 receives an optional time t from the unique time generating device 27 in the specific computer 26 at an optional point such as when the return key is depressed during the preparation of the text; on the other hand, where the computer-made information is graphic data, the time data setting section 25 receives an optional time t from the unique time generating device 27 at an optional point such as when the information is temporarily stored into the hard disk. The unique time measurement t to be received is optionally determined in advance by the time data setting section 25 and treated as a so-called "black box" that can not be analyzed even by the specific computer 26.

Once the optional unique time measurement t is received from the unique time generating device 27, the time data setting section 25 forwards the received unique time measurement t to an encrypting section 28. The encrypting section 28, in turn, scrambles and encrypts numerical value data based on the unique time measurement under a predetermined rule. This way, the optional unique time measurement is converted into time data tx. The converted time data tx is fed back to the time data setting section 25, which in turn stores the fed-back time data tx at respective predetermined locations in a memory 29 (e.g., hard disk) of the computer 26 and information storage medium (floppy disk in the example of FIG. 23) where the computer-made information is stored.

When the storage medium (floppy disk) having the thus-made information stored therein is to be used by the information creator, the floppy disk is set in a disk driver of the computer 26 and then a collating section 30 of FIG. 24 operates as follows. The collating section 30 retrieves and collates the time data tx from the respective predetermined locations of the memory 29 and floppy disk. Only when the two retrieved time data tx match with each other, access to the information (computer software, personalized information or data) stored on the storage medium (floppy disk) is permitted, so that it is possible to, for example, copy, reenter or renew the information.

According to the present embodiment arranged in the above-described manner, the time data tx is stored into the specific computer 26 and storage medium where the information is to be retained, during or after the making of the information by the computer 26. Thus, mutual authentication between the two is effected so as to determine a computer that is authorized to access the information storage medium. As a consequence, when the information storage medium (floppy disk) is driven on another computer for unauthorized copying or utilization of the information, an error detection is made by collating the time data. This effectively prevents unauthorized utilization of the computer-made information. On the other hand, an authorized or regular computer (specific computer) is allowed to freely access the information. Thus, by storing the computer-made information in the specific computer along with the personalized information (e.g., personal code number) to restrict use of the specific computer by any third person, leakage of the confidential information can be reliably prevented.

Whereas the authentication device using the unique time generating device according to the second embodiment has been described as setting the time data using a single optional unique time measurement indicated by the unique time generating device, the time data tx may be set by selectively extracting one of a plurality of times in the information making operation, or combining these times. For example, where the computer-made information is text data entered via a word processor, a unique time measurement t to be set may be obtained from the unique time generating device 27 every new paragraph or every punctuation mark, and some of these obtained unique time measurements may be extracted in accordance with a predetermined rule (e.g., every tenth line or every odd-numbered line). Where the computer-made information is data on a drawing or address book, a plurality of unique time measurements t for every new page may be used, or where time data are stored into the information storage medium dividedly over a plurality of days or times, each time when the data is stored into the medium may be renewably set as the time to be set so that time data is set and stored in both the computer memory and the information storage medium.

Industrial Applicability of the Invention

The present invention as has been so far described achieves the benefit that intercommunication between computers can be conducted on the basis of a common time concept and mutual authentication between computers can be executed without errors. Further, by using different unique time measurements yielded by a plurality of the unique time generating devices of the invention, various transactions, such as exchange transaction, communication-based sale and stock exchange, can be conducted in real time smoothly between the computers via a personal computer or network communication, and mutual identification or authentication of the parties in the communication-based transactions can be carried out easily. Furthermore, by allowing the thus-generated unique time measurement to be recognized by computer software that is supplied by a software company for authorized use, it is possible to prevent the software from being unfairly copied or used in other computers than a specific computer. In addition, by allowing data based on the unique time measurement to be recognized by an information storage medium storing particular information such as computer software, personalized information or data made by a specific computer it is possible to prevent the information from being unfairly used in other computers than the specified computer.

What is claimed is:

1. A device for providing a time reference in computers that are produced at different points in time, comprising:

timer means for generating periodic timer signals; and accumulating means for counting a number of timer signals outputted by said timer means within a preset time-measuring period that begins at a given starting point on a selected date and terminates at a given future ending point, wherein each of said computers counts timer signals within a time-measuring period having a unique starting point and a unique ending point.

2. A device as defined in claim 1 wherein respective starting points of the time-measuring periods allocated to said computers are different from each other by a predetermined interval.

3. A device as defined in claim 1 wherein respective time-measuring periods allocated to said computers begin at a same starting point but have respective durations differing from each other by a predetermined length.

4. A device as defined in claim 1 wherein a unique starting point of a time measuring period of a computer corresponds to a manufacturer of the computer.

5. A device in a CPU for providing a time reference in computers that are produced at successive points in time, comprising:

timer means for generating periodic timer signals; and accumulating means for counting a number of timer signals outputted by said timer means within a preset time-measuring period that begins at a given starting point on a selected date and terminates at a given future ending point, wherein each of said computers counts timer signals within a time-measuring period having the same starting point and ending point.

6. A device as defined in claim 5 wherein communication between two or more of the computers is conducted using a common number of timer signals counted by the respective accumulating means of each of the computers.

7. A device as defined in claim 5, wherein a communication from a first computer to a second computer controls a device connected to the second computer using a common number of timer signals counted by the respective accumulating means of each of the computers.

* * * * *